(12) United States Patent
Kochergin et al.

(10) Patent No.: US 7,045,052 B2
(45) Date of Patent: May 16, 2006

(54) METHOD OF MANUFACTURING A SPECTRAL FILTER FOR GREEN AND LONGER WAVELENGTHS

(75) Inventors: Vladimir Kochergin, Westerville, OH (US); Philip Swinehart, Columbus, OH (US)

(73) Assignee: Lake Shore Cryotronics, Inc., Westerville, OH (US)

( * ) Notice: Subject to any disclaimer, the term of this patent is extended or adjusted under 35 U.S.C. 154(b) by 228 days.

(21) Appl. No.: 10/686,519

(22) Filed: Oct. 16, 2003

(65) Prior Publication Data

US 2004/0134879 A1   Jul. 15, 2004

Related U.S. Application Data

(60) Provisional application No. 60/418,361, filed on Oct. 16, 2002.

(51) Int. Cl.
*C25F 3/00* (2006.01)
*C25F 7/00* (2006.01)
*C23F 1/00* (2006.01)

(52) U.S. Cl. ............... 205/656; 205/665; 205/667; 205/684; 205/674; 216/2; 216/24; 216/49; 216/56; 216/67; 216/79; 216/99

(58) Field of Classification Search ............... 205/656, 205/665, 667, 684, 674, 666, 655; 216/2, 216/24, 49, 56, 67, 79, 99
See application file for complete search history.

(56) References Cited

U.S. PATENT DOCUMENTS

| | | | |
|---|---|---|---|
| 4,689,125 A | * | 8/1987 | Burrus et al. ............... 205/655 |
| 4,874,484 A | | 10/1989 | Foell et al. |
| 5,262,021 A | * | 11/1993 | Lehmann et al. ............... 205/655 |
| 5,348,627 A | | 9/1994 | Propst et al. |
| 5,431,766 A | | 7/1995 | Propst et al. |
| 5,544,772 A | | 8/1996 | Soave et al. |
| 5,645,684 A | | 7/1997 | Keller |
| 5,987,208 A | | 11/1999 | Grunig |
| 5,997,713 A | | 12/1999 | Beetz, Jr. et al. |
| 6,004,450 A | | 12/1999 | Northrup et al. |
| 6,468,823 B1 | | 10/2002 | Scherer et al. |
| 6,483,640 B1 | | 11/2002 | Tonucci et al. |
| 6,521,149 B1 | | 2/2003 | Mearini et al. |
| 6,526,191 B1 | | 2/2003 | Geusic et al. |

FOREIGN PATENT DOCUMENTS

DE          4202454          1/1992

OTHER PUBLICATIONS

Lehmann et al., Optical shortpass filters based on macroporous silicon *Appl. Phys. Lett.* V 78, N.5, Jan. 2001.

(Continued)

*Primary Examiner*—Donald R. Valentine
(74) *Attorney, Agent, or Firm*—Nixon & Vanderhye P.C.

(57) ABSTRACT

A method of manufacture for optical spectral filters with omnidirectional properties in the visible, near IR, mid IR and/or far IR (infrared) spectral ranges is based on the formation of large arrays of coherently modulated waveguides by electrochemical etching of a semiconductor wafer to form a pore array. Further processing of said porous semiconductor wafer optimizes the filtering properties of such a material. The method of filter manufacturing is large scale compatible and economically favorable. The resulting exemplary non-limiting illustrative filters are stable, do not degrade over time, do not exhibit material delamination problems and offer superior transmittance for use as bandpass, band blocking and narrow-bandpass filters. Such filters are useful for a wide variety of applications including but not limited to spectroscopy, optical communications, astronomy and sensing.

37 Claims, 20 Drawing Sheets

OTHER PUBLICATIONS

J. Schilling et al., "Three–dimensional photonic crystals based on Macroporous silicon with modulated pore diameter", *Appl. Phys. Lett.* V 78, N.9, Feb. 2001.

S. Izuo et al., "A novel electrochemical etching technique for n–type silicon," *Sensors and Actuators* A 97–98 (2002), pp. 720–724, no month.

A. Vyatkin et al., "Random and Ordered Macropore Formation in p–Type Silicon," *J. of the Electrochem. Soc.*, 149 (1), pp. G70–G76 (2002), no month.

H. Föll et. al, "Formation and application of porous silicon", *Mat. Sci. Eng.* R 39 (2002), pp. 93–141, no month.

S. Langa et al., "Observation of crossing pores in anodically etched n–GaAs," *Appl. Phys. Lett.* 78(8), pp. 1074–1076, (2001), no month.

H H Föll et al., "Porous III–V compound semiconductors: formation, properties, and comparison to silicon", *Phys. Stat. Sol. A*, 197 (1), pp. 61–70 (2003), no month.

M. Christophersen et al., "A comparison of pores in silicon and pores in III–V compound materials", *Phys. Stat. Sol. A*, 197 (1), pp. 197–203, (2003), no month.

H. Föll et al., "Pores in III–V Semiconductors", *Adv. Materials, Review, 2003*, 15, pp. 183–198, (2003), no month.

S. Langa et al., *Phys. Stat. sol. A*, 197 (1), p. 77, (2003) "Single crystalline 2D porous arrays obtained by self organization in n–InP" (pp. 77–82), no month.

K. Barla et al., "X–Ray Topographic Characterization of Porous Silicon Layers," *J. Cryst. Growth*, 68, North–Holland, Amsterdam, p. 721–726 (1984), no month.

B.H. Erne et al., "Porous Etching: A Means to Enhance the Photo response of Indirect Semiconductors," *Adv. Mater.*, 7, p. 739–742 (1995), no month.

P.A. Kohl et al., J. Electrochem. Soc., 130 (111), "The Photoelectrochemical Oxidation of (100), (111), and (1̄1̄1̄) n–InP and n–GaAs," p. 2288–2293 (Nov. 1983).

Schmuki P. et al., *Physica Status Solidi A*, "Pore Formation on n–InP," 182(1), pp. 51–61, (2000), no month.

S. Langa et al., "Formation of Porous Layers with Different Morphologies during Anodic Etching in n–InP," *J Electrochem. Soc. Lett.*, 3(11), p. 514–516, (2000), no month.

S. Langa et al., *Phys. Stat. Sol.* (A), 195 (3), "Electrochemical pore etching in Ge," R4–R6 (2003), no month.

Macleod H.A., *Thin–Film Optical Filters*, 3rd ed., Institute of Physics Publishing, 2001, no month.

D.J. Lockwood et al., "Optical properties of porous GaAs," *Physica E*, 4, pp. 102–110 (1999), no month.

Schmulki, P. et al., "Formation of porous layers on InSb(100) by anodization," *Phys. Stat. Sol.* (a) 197, No. 1, pp. 71–76 (2003), no month.

Langa, S. et al., "Voltage oscillations—an emergent property at high density pore growth," *Phys. Stat. Sol.* (a) 197, No. 1, pp. 186–191 (2003), no month.

\* cited by examiner

METHOD OF MANUFACTURING A SPECTRAL FILTER FOR GREEN AND LONGER WAVELENGTHS

CROSS-REFERENCES TO RELATED APPLICATIONS

This application claims the benefit of provisional application No. 60/418,361 filed Oct. 16, 2002, incorporated herein by reference. This application is related to commonly-assigned copending application Ser. No. 10/686,520 of Kochergin filed concurrently herewith entitled "SPECTRAL FILTER FOR GREEN AND LONGER WAVELENGTHS" also incorporated herein by reference.

STATEMENT REGARDING FEDERALLY SPONSORED RESEARCH OR DEVELOPMENT

Not applicable.

FIELD

The technology herein relates to methods of fabricating optical filters, and more specifically to ways to make optical filters constructed of artificially structured materials. Still more particularly, the technology herein relates to techniques for manufacturing visible, near infrared, mid infrared and far infrared optical filters having significantly improved optical performance, manufacturability, extended physical longevity, transmitted wavelength stability and cost.

BACKGROUND AND SUMMARY

Generally, optical filters and coatings are passive components whose basic function is to define or improve the performance of optical systems. There are many types of optical filters and they are used for a broad range of different applications. One common type of optical filter is a sunglass lens. Polarized sunglass lenses filter out light with a certain direction of polarization in addition to reducing the sun's intensity. Applications of optical filters and coatings can be diverse as in anti-glare computer screens, colored glass, sighting devices, and electrical spark imagers—to name just a few.

Some optical filters are specialized for different wavelength ranges of light because of limitations in available materials that are optically transparent in the range of interest. For example, many applications and instruments require optical filters that can be used to tune the optical behavior of light in the near infrared, mid infrared or far infrared wavelength range (i.e., at frequencies of radiant energy that are generally below the frequencies of visible light). Some example applications for such filters include far- and mid-IR focal-plane arrays for military applications, chemical sensing, astronomy, wavelength division multiplexing in optical communications, space observations to name a few.

Much work has been done in the past to develop useful optical filters and coatings for different wavelength ranges. Widely spread filter types include: absorption-based filters (i.e., filters where the rejection of light is caused by absorption in filter material) and interference-based filters (i.e., filters where the rejection of light is caused by reflectance from multiple layers composing the filter). Detailed discussion of such filters can be found in for example Macleod H. A., *Thin-Film Optical Filters*, 3rd ed., Institute of Physics Publishing, 2001.

Exemplary Absorption Type Filters

Absorption filters generally consist of a thin film or slide of material that has an absorption feature (band or edge) at the required wavelength or incorporates an optically excitable material, such as a color center. Filters that utilize semiconductor material can serve as an illustrative example of an edge absorption filter (more particularly long-pass filters). Semiconductors are known to have an absorption band that extends to some characteristic wavelength, which corresponds to the bandgap energy of a particular semiconductor. The transmission/rejection edge could be made very sharp for a semiconductor layer thicknesses above 100 μm. Absorption band edge of different semiconductors and semiconductor composites can vary from ~500 nm for gallium phosphate (GaP) and aluminum arsenate (AlAs) to more than 2 μm for indium arsenate (InAs) and InSb. The absorption band edge can be smoothly tuned by adjusting the semiconductor composition (for example, $Al_xGa_{1-x}As$ absorption band edge tunes quite linearly from 2.1 eV for x=1 to 1.4 for x=0), long-pass filters can be obtained with a reasonably sharp edge for any wavelength at the ~500 to 2400 nm range). However, at least some semiconductor-based long-pass filters have a significant disadvantage—i.e., high reflection losses caused by the high refractive index of semiconductor materials. Such a problem is usually solved by antireflection coatings of both semiconductor surfaces in the case of semiconductor wafer (or slide) used or, in the case of thin film semiconductor material, of the top and between the substrate and the layer of semiconductor material. However, such an approach can also have some significant disadvantages. While the absorption edge shape and position of uncoated semiconductor film does not depend on angle of incidence (only the degree of an absorption value changes), both the absorption edge shape and position of antireflection-coated semiconductor film depend on angle of incidence. Hence, the filter can in at least some cases be used effectively only for some limited angular range. In addition, semiconductor absorption edges show strong temperature dependence. It also should be noted that semiconductor-based absorption filter cannot be used as a band-pass or narrow-band pass filtering, since the absorption bands of semiconductors are generally wide.

Other materials that are sometimes used to form absorption filters include colored-glass filters (for example, Schott glass filter). Such colored-glass filters generally operate through the process of ionic absorption of inorganic material, dispersed uniformly through the glass slide or through the absorptive scattering of crystallites formed within the glass. Such filters generally offer fairly wide design freedom in terms of absorption band position and can be arranged either in short-pass, long-pass or band-blocking forms. The significantly lower refractive index of such filters as compared to semiconductor filters make the reflection losses lower. The temperature dependence of the rejection band edge position of such filters is also lower than that of semiconductors. However, such filters can also suffer from considerable limitations. For example, the transmission through the transparency range of such filters is usually not very uniform therefore, such filters in some cases cannot tolerate high power and/or are not well-suited for narrow bandpass filters.

Exemplary Interference Type Filters

Generally, the basis of interference filters is a Fabry-Perot interferometer. A Fabry-Perot (FP) interferometer can be imagined as a thin film having two flat surfaces that are parallel to each other and coated with relatively high-reflectance coatings. In practice, a different realization of Fabry-Perot interferometer is common—the so-called Fabry-Perot etalon, which consists of two flat plates separated by a distance d and aligned parallel to each other with a high degree of accuracy. The separation is usually maintained by a spacer ring made of quartz or Invar, and the inner surfaces of the two plates are usually coated to enhance their reflections. The spectral dependence of the transmittance through an FP interferometer contains peaks and valleys. The peaks of transmittance are known as fringes. It can be proven that the maximum values of transmittance at the peaks reach unity if the Fabry-Perot interferometer is constructed from nonabsorptive materials.

The classic design of a high-reflectance coating is based on alternating quarter-wave layers of two different materials. The high reflectance in a quarter-wave layer stack takes place because the light beams, reflected from all the interfaces in the multilayer, are in phase when they reach the front surface where constructive interference of all the reflected waves occurs. As with the Fabry-Perot etalon, the reflectance spectrum of such a multilayer contains multiple reflection peaks corresponding to the phase-matching conditions of the reflected waves at the different interfaces. However, these reflection maximums are considerably wider than that of the Fabry-Perot etalon. The width of the high reflectance plateau depends on the refractive index contrast between the low and high refractive index materials that compose the high reflectance multilayer. As follows from the above discussion, the high-reflectance dielectric multilayer can be constructed to have very high reflectance over a wide range of wavelengths. However, such multilayers can have some disadvantages. One possible disadvantage is that the high reflectance zone of such a reflector, although it can be made wide, is still limited. Moreover, since the reflectance peaks are located where the waves reflected from each interface in multilayer are in phase, the wavelength positions for the reflectance peaks may strongly depend on the angle of incidence, similar to the Fabry-Perot etalon case.

A quarter-wave stack can be considered as the basic type of interference edge filter. The transmission spectrum of the quarter-wave stack contains alternating low- and high-reflectance zones and, hence, alternative high- and low-transmittance zones. Such a filter can be used as a long-pass filter or as a short-pass filter. Edge wavelengths can be tuned by changing the wavelength at which the stack is quarter-wave. Such an edge filter will be suitable for relatively narrow-band applications, that is, when the width of the rejection zone is greater than the spectral width of light to be eliminated. For all other cases, the required elimination of all wavelengths shorter than (or longer than) a particular value requires a different filter design.

Perhaps the simplest design of a narrowband-pass filter is the Fabry-Perot filter discussed previously. However, the spectral pass-band shape of the Fabry-Perot filter is triangular. In addition, the original design generally may require two precisely aligned and spaced high-flatness plates, which may not be practical for many applications. Therefore, narrowband-pass filters are usually made in slightly modified form with respect to a Fabry-Perot etalon. A Fabry-Perot thin film filter is a thin film assembly consisting of a dielectric layer bounded by either two metallic reflecting layers or by two multilayer dielectric reflectors. The realization of a Fabry-Perot filter with metallic reflective layers is called a metal-dielectric Fabry-Perot filter, while a Fabry-Perot filter with two dielectric multilayer reflectors is called an all-dielectric Fabry-Perot filter.

The metal-dielectric Fabry-Perot filter is perhaps the simplest realization of a narrowband-pass filter. In such filters, the dielectric layer, surrounded by metal reflection layers, serves as a spacer in the Fabry-Perot etalon. and therefore, is called a spacer layer. The metallic reflective layers must provide reasonably high reflectivity at the surface while keeping losses as low as possible. For the visible region of the spectrum, silver is an optimal metal, while for ultraviolet and deep ultraviolet aluminum is the preferred material. However, other metals can be used as well.

The degree of light absorption is perhaps the biggest disadvantage of metal-dielectric narrowband-pass filters. Although absorption during a single reflection from thin metal film is small and absorption during transmission also can be minimized by using thin metal films, in a Fabry-Perot cavity absorption is greatly enhanced due to multiple reflections of the transmitted light. Metal-dielectric Fabry-Perot filters have the same dependence of the transmittance peak wavelength as the Fabry-Perot cavity. In addition to this disadvantage, the absorbance of such a filter strongly depends on the angle of incidence. Such filters are usually used in applications where other filters, such as all-dielectric Fabry-Perot filters, are prohibited by either cost or other factors, such as the inability to function in the deep As was discussed above, in the all-dielectric Fabry-Perot filter the metallic reflecting layers are replaced by high-reflectance dielectric multilayers. Two different cases of such filters can be considered: {Air| H L H L . . . H L H H L H . . . L H L H| Substrate} and {Air| H L H L . . . L H L L H L . . . L H L H| Substrate}, where H indicates the higher index of refraction and L indicates the lower index of refraction. The refractive indices of the layers adjacent to air and the substrate should be high to maximize the reflection from the multilayer. The transmission spectrum of an all-dielectric Fabry-Perot will be a narrow maximum within a broad minimum. The width of the maximum and the transmittance at the maximum will depend upon the reflectivities of the two multilayer stacks.

The central position of the transmittance peak in the all-dielectric Fabry-Perot filters is generally the same as for air cavity Fabry-Perot filters. However, the effect of variations in angle of incidence can be more severe for narrowband-pass filters than that of bandpass, band edge or multilayer reflectors due to a generally narrow transmittance peak. Shifts of the central position of the transmittance peak as strong as 800% in terms of the transmittance peak half width at just a 30 degrees tilt are not uncommon. Such a strong angular dependence of the transmittance spectra of all-dielectric Fabry-Perot filters causes strong dependence of the transmittance spectra on the convergence (or divergence) of the incident beam. Hence, all-dielectric Fabry-Perot filters are often suitable only for plane-parallel or slightly convergent or divergent beams, which causes additional complexity in the optical designs employing such filters.

As was discussed above, the transmitted spectral shape of the all-dielectric Fabry-Perot filter is generally not ideal. For many filter purposes, a nearly rectangular shape of the transmittance spectra is desired. In addition, the maximum achievable rejection in the rejection zone of the filter and the bandwidth of the transmission zone are related. That is, for a given rejection factor, the bandwidth value of the filter is predetermined if the refractive indices of the layers in the filter are fixed. The solution of this problem was found in using multiple-cavity filter designs.

Exemplary Multi-Cavity Interference Filter Designs

Perhaps the simplest type of multiple cavity filter is a double-cavity filter. Such a filter has the structure of {Air|reflector|half-wave spacer|reflector|half-wave spacer|reflector|Substrate}. Such a structure can have some advantages with respect to a single-cavity design. However, for some applications such as dense wavelength division multiplexing (DWDM), a better spectral shape may be needed. The important criteria in high-performance, narrowband-pass filters are steeper edges and a flatter top on the transmission peak. For two-cavity filter designs, the peaks at both sides of pass band (so-called "rabbit's ears") are prominent. In this case the number of cavities needed can be considerably more than two to reduce the "rabbit's ears."

Although at normal incidence the advantages of multiple-cavity filters are geneally strong, the effects of variations of angle of incidence and beam divergence on the transmittance spectra can be more severe for multiple-cavity, all-dielectric Fabry-Perot filters than for single cavity filters. This occurs because the rectangular shape of the pass band of the multiple-cavity filter is due to phase matching between the light waves reflected from the different reflector stacks in the multiple-cavity structure. The phase-matched conditions hold only for a distinct angle and wavelength. Unlike single-cavity filters, where the transmittance peak generally experiences a wavelength shift when illuminated at non-normal angles without significant perturbation of its shape, in multiple-cavity, all-dielectric Fabry-Perot filters the shape of the transmittance band generally changes dramatically with variations in the angle of incidence. The flat top of the multiple-cavity filter at normal incidence frequently resolves into separate narrow transmittance peaks related to the interference between the waves reflected from different reflector stacks within the multiple-cavity multi-layer structure. Hence, multiple cavity, all-dielectric Fabry-Perot filters can become unusable at incident angles more than 3 to 5 degrees from normal incidence. Such a property is important in DWDM filters where several hundred layers may be required to produce flat topped transmittance bands with bandwidths narrower than 1 nm. Additional precise mechanical alignment may solve this problem, but with additional complexity and resultant additional cost.

In addition, multiple-cavity, all-dielectric Fabry-Perot filters generally require the incident beam to be highly collimated. The shape of the pass band of such filters degrades significantly even for Gaussian beams, the convergence (or divergence) angle of which is about 10–15 degrees. Hence, multiple-cavity, all-dielectric Fabry-Perot filters generally can require not only precise mechanical alignment to ensure normal incidence of the beam, but also a high degree of collimation. Several other significant disadvantages exist with multiple-cavity, all-dielectric Fabry-Perot filters. These disadvantages may include the presence of long-wave pass bands (i.e., wavelength-limited rejection bands) and significant difficulties in manufacturing such filters for short wavelength spectral ranges (deep and far ultraviolet). For the applications that require the useful filter properties in the UV ranges, multiple-cavity metal dielectric filters are usually used. In particular, it has been found that, in addition to the disadvantages of an all-dielectric Fabry-Perot filter such as the relationship between pass-band bandwidth and maximum obtainable rejection and the resultant triangular shape of the pass band, the single-cavity metal-dielectric Fabry-Perot filters exhibit increased losses with decrease of the pass-band bandwidth due to the losses in the metal.

In multiple-cavity, metal-dielectric Fabry-Perot filters, this problem is usually solved by an induced-transmission design. This phenomenon serves as the basis of such filters so that it is possible to match metal layers and dielectric spacer thicknesses such that, for a given wavelength and angle of incidence, the localization of the light in the metal layers during transmission is minimal at the same time it is maximized inside the dielectric layers. Using such a design, it is still usually not practical or possible to achieve perfect transmission. However, the transmission can be made somewhat greater than 50%, combined with near square pass band shape and simultaneously good control of rejection and pass band bandwidth. Multiple-cavity metal-dielectric filters can, however, have some significant disadvantages. In addition to an angular shift of the wavelength position of the pass band due to absorption in metal layer, such filters may not be suitable for high-power applications. The temperature dependence of the optical performance of such filters also can be the strongest among all interference-based filters.

Various different designs for spectral filters are known. Among them it worthwhile to mention ultraviolet optical filter disclosed in Lehmann et al., *Appl. Phys. Lett*. V 78, N.5, January 2001. The filter configuration of Lehmann et al., *Appl. Phys. Lett*. V 78, N.5, January 2001 is based on the spectral filtering of light in an array of leaky waveguides in the form of pores in Macroporous Silicon ("MPSi"). One such an illustrative method of optical filter manufacturing consists of forming a freestanding macropore array from N-doped Si wafer in fluoride-containing electrolyte under certain backside illumination conditions. Precise control over the pore distribution across the surface of the wafer may be possible if preliminary patterning of the silicon wafer surface with regularly distributed depressions (so-called "etch pits") is performed. A method of manufacturing such filters by forming of free-standing macropore arrays from n-doped Si wafer is disclosed and claimed can be found for example in U.S. Pat. No. 5,262,021 issued to V. Lehmann et al. Nov. 16, 1993. Lehmann also discloses the use of such arrays as optical filters. However, it appears that the method of removing the macroporous layer from the Si wafer, as disclosed in U.S. Pat. No. 5,262,021, will result in the second surface of the macroporous layer being inherently rough, causing higher losses due to scattering. Lehmann seems to use the MPSi layer without any further modifications. Thus, while such filters exhibit some short-pass filtering, the transmission spectral shape through them may be unusable for commercial applications due to the wide blocking edge.

Macroporous silicon layers with modulated pore diameters throughout the pore depth are disclosed in, for example, U.S. Pat. No. 5,987,208 issued to U. Gruning and V. Lehmann et al. Nov. 16, 1999 or J. Schilling et al., *Appl. Phys. Lett*. V 78, N.9, February 2001. These structures may not exhibit advantageous properties such as independence of the spectral response of the filter on the angle of light incidence for at least two reasons. First, the structure of these filters (i.e. a hexagonal array of pores) may not be suitable to act as an array of waveguides, so the filtering may be directly affected by the angle of incidence of light on the structure. Second, the pore modulation period, pore array period and the Bragg wavelength seem to be chosen in the prior art so that the light traveling through such a structure effectively averages the dielectric properties of the structure (similar to what happens in microporous silicon-based filters). The resulting optical behavior will therefore likely be close to that of ordinary interference filters.

FIG. 1 is a diagrammatic perspective view of an exemplary prior art freestanding MPSi uniform pore array section of a uniform cubic lattice. The FIG. 1 exemplary prior art spectral filter consists of air- or vacuum-filled macropores 1.2 disposed in the silicon host wafer 1.1 starting from the $1^{st}$ surface 1.3 of the filter wafer and ending at the $2^{nd}$ surface 1.4 of the filter wafer. The macropores 1.2 are disposed such that an ordered, uniform macropore array is formed (the ordering may be a key attribute). The pore ends are open at both first and second surfaces of the silicon wafer 1.1. Since silicon is opaque in the deep UV, UV, visible and part of the near IR wavelength ranges, light can pass through the structure shown in FIG. 1 only through the pores. As shown in FIG. 2, the silicon absorption coefficient k is very high at wavelengths below ~400 nm and moderately high at wavelengths below ~900 nm, which blocks all radiation coming through the silicon having a thickness of about 50 μm or more.

Since pore diameters of 100 nm to 5000 nm are comparable to the wavelength of light (200 nm–1000 nm) and, due to the high aspect ratios possible in MPSi structures ((t/d) >30), the transmission through such a macroporous structure at wavelengths below about 700 nm takes place through leaky waveguide modes. In such leaky waveguides, the cores are air or vacuum-filled, while the reflective walls are the pore walls. Hence, MPSi material can be considered as an ordered array of leaky waveguides at wavelengths below about 700 nm. By means of the high absorption of the walls, each leaky waveguide pore can be considered to be independent of the others in the visible, UV and deep UV spectral ranges if they are separated by silicon walls with thicknesses >20–100 nm.

In the near IR and IR wavelength ranges, the nature of the transmission through the filter of FIG. 1 changes. This happens because silicon becomes less opaque at 700–900 nm and becomes transparent at wavelengths starting approximately from 1100 nm. Light at these wavelengths can pass through the MPSi structure of FIG. 1 not only through the pores, but also through the silicon host. Due to the porous nature of the silicon host, the transmission of light propagating at angles close to the perpendicular (normal) direction to the surface of the MPSi structure occurs through waveguide modes confined in the silicon host for wavelengths comparable to the pitch of the pore array. As a high refractive index material, silicon can support waveguide modes if surrounded by a lower refractive index material (air or vacuum).

Since close packing of the pores is essential for efficient transmission through the filter of FIG. 1, such a structure can be considered to some approximation in the near IR and IR wavelength ranges as an array of Si waveguides in an air host. For the light propagating at oblique angles (>about ±15° from the normal), non-waveguiding channels of transmission through the structures of FIG. 1 arise. However, such transmission is accomplished by strong reflection and scattering because of the necessity of crossing the boundaries between host and pore, and in the far field of the filter in many cases this light can be neglected. In the near field, however, such transmission channels usually should be taken into account. When the wavelength of light becomes much larger than the pore array pitch, the light starts interacting with the MPSi layer as if it were a single layer of uniform material having its dielectric constants averaged throughout the pores and the host. As an illustration, for a square array of pores with 4 μm pitch, transmission as through a layer of uniform material takes place starting approximately at a wavelength of 20 μm.

Depending on pore size and pore array geometry, leaky waveguides in the deep UV, UV, and visible spectral ranges and waveguides in the near IR and IR spectral ranges can be either single mode (i.e., supporting only the fundamental mode) or multimode (higher order modes are also supported).

For both leaky waveguide and waveguide modes, the mode-coupling coefficient is the highest for the fundamental mode and quickly decreases with the increasing mode order. If a plane-parallel beam of light is incident on the MPSi interface, the coupling efficiency to the leaky waveguide fundamental mode can be roughly estimated as:

$$P(\lambda) \approx \frac{S}{S_{uc}},$$

where S is the area of pores 1.2 in FIG. 1, while $S_{uc}$ is the area of a MPSi array unit cell (which can be introduced for ordered MPSi arrays only). In other words, to a good approximation, $P_{00}^{LW}(\lambda) \sim p$ in the UV spectral range, where p is the porosity of an MPSi filter near the first MPSi wafer interface. For the waveguide transmission (i.e., for Near IR or IR wavelength ranges), the formula for the coupling efficiency, $P_{00}^{W}(\lambda)$, can also be simplified to:

$$P_{00}^{W}(\lambda) \approx \frac{4 n_{Si}(\lambda) \cdot n_I}{(n_{Si}(\lambda) + n_I)^2} \cdot \frac{S_{uc} - S_p}{S_{uc}},$$

where $n_{Si}(\lambda)$ is the refractive index of silicon at the wavelength $\lambda$ and $n_1$ is the refractive index of the medium from where light is incident on MPSi layer. For the most common case of air $$P_{00}^{W}(\lambda) \approx \frac{4 n_{Si}(\lambda)}{(n_{Si}(\lambda) + 1)^2} \cdot \frac{S_{uc} - S_p}{S_{uc}}.$$

In other words, $P_{0.0}^{LW}(\lambda) \approx p$ and $P_{0.0}^{W}(\lambda) \approx 0.69(1-p)$, where p is porosity of MPSi layer. For the filter of FIG. 1, the approximation given above for waveguide case (i.e., for near IR and IR wavelength ranges) is not as good as for the leaky waveguide case (deep UV, UV and VIS spectral ranges) due to strong cross-coupling between neighbor waveguides and due to the presence of the previously described non-waveguiding channel of transmission. This cross-coupling is not taken into account by the approximation set forth above.

At the second interface of MPSi filter, the light from waveguide ends (leaky or not, as applicable) is emitted with a divergence governed by the numerical aperture, NA, and wavelength. In the far field, the destructive and constructive interference of all light sources in the form of leaky waveguide or waveguide ends takes place. In the case of an ordered MPSi array, this leads to a number of diffraction orders, which are defined by the pore array geometry (i.e., by the relationship between pore size, and pore-to-pore distance) and the wavelength of the light. For most applications of optical filters, only light outcoupled into the $0^{th}$-diffraction order is of interest. However, some applications are not sensitive to the outcoupling of light to higher diffraction orders, for instance when the filter is directly mounted on the top of a photodetector or a detector array. In other cases, the main source of outcoupling losses is the redistribution of light into higher diffraction orders. Such losses are sensitive to both wavelength and pore array geometry. They are more pronounced at short wavelengths due to the higher number of diffraction orders.

Outcoupling losses can be completely suppressed for any given wavelength if the MPSi array period is less than or equal to that wavelength. For instance, for a 1550 nm wavelength that is important for optical communications, this will require a pore array period on the order of 1550 nm or less and pore diameters of about 300–1000 nm.

The exemplary prior art spectral filter structure of FIG. 1 cannot be used as a band-pass or narrow band-pass filter in the near IR or IR since the structure of FIG. 1 passes the light above the absorption band of silicon uniformly and does not offer any means to select a specific passing or blocking band.

In order for it to serve as a band-pass or narrow bandpass filter, some improvements in its design should be made.

Information about manufacturing of straight pore MPSi arrays can be found in U.S. Pat. No. 5,262,021 issued to V. Lehmann et al. Nov. 16, 1993 (which claims priority to Fed. Rep. Of Germany Patent # 4202454, issued Jan. 29, 1992), in which a method of the formation of free-standing macropore arrays from an n-doped Si wafer is disclosed. Lehmann also describes the use of such arrays as optical filters. However, as explained above, Lehmann's structures cannot provide any useful filtering in the IR spectral range. In addition, the method of removing the macroporous layer from the Si wafer, as disclosed in U.S. Pat. No. 5,262,021, will result in the second surface of the macroporous layer being inherently rough, causing high losses due to scattering.

Macroporous silicon layers with modulated pore diameters throughout the pore depth is disclosed in, for example, [U.S. Pat. No. 5,987,208 issued to U. Gruning and V. Lehmann et al. Nov. 16, 1999] or [J. Schilling et al., *Appl. Phys. Lett.* V 78, N.9, February 2001]. However, in the first of these disclosures only a 3-layer system is disclosed which is not useful for spectral filtering (it was designed to be a lateral waveguiding structure), while in second disclosure the dimensions of the MPSi array are not suitable for providing omnidirectional filtering. The silicon island waveguides are strongly coupled due to the disclosed pore topology (the structure has been designed to provide Photonic Bandgap properties, not an array of uncoupled waveguides).

There are also several disclosures related to the method of manufacture of macroporous structures with controlled positions of the pores. One of the first such disclosures is U.S. Pat. No. 4,874,484 issued to H. Föll and V. Lehmann issued Oct. 17, 1989 (which claims priority to Fed. Rep. Of Germany Patent # 3717851 dated May 27, 1987). This patent describes a method of generating MPSi arrays from n-doped (100)-oriented silicon wafers in HF-based aqueous electrolytes (i.e., electrolytes based on HF diluted with water) under the presence of backside illumination. It also describes a method of controlling the position of macropores through formation of etch-pits. Etch pits are typically, but not exclusively, pyramid-shaped openings formed on the silicon or other semiconductor surface that can be formed through mask openings upon exposure to anisotropic chemical etchants. In addition, the use of wetting agents (such as formaldehyde) and controlling the pore profile through chronologically-varying applied electrical potentials also were disclosed. However, the geometries of array provided in this disclosure can not satisfy the requirement of low optical coupling between neighboring silicon island waveguides required for omnidirectional filtering. Thus, the optical filtering applications of the structures disclosed by Föll and Lehmann were not foreseen, and the method of fabrication disclosed therein is not suitable for the formation of a deep MPSi layer with controllable pore diameters along the entire depth of the MPSi layer. This is because changes of the pore growth speed with depth are not taken into account.

A method of MPSi layer formation in non-aqueous electrolytes is disclosed in U.S. Pat. No. 5,348,627 issued Sep. 20, 1994 and U.S. Pat. No. 5,431,766 issued Jul. 11, 1995, both to E. K. Propst and P. A. Kohl. Organic solvent-based electrolytes were used for forming porous layers in n-doped silicon under the influence the front-side illumination. Example solvent based electrolytes are acetonitrile (MeCN), diemethyl formamide (DMF), propylene carbonate ($C_3O_3H_6$) and methylene chloride ($CH_2Cl_2$)) containing organic supporting electrolytes, such as the examples of tetrabutilammonium perchlorate ($C_{16}H_{36}NClO_4$), tetramethylammonium perchlorate ($C_4H_{12}NClO_4$) and anhydrous sources of fluoride, HF, fluoroborate ($BF_4^-$), tetrabutylammonium tetrafluoroborate (TBAFB), aluminum hexafluorate ($AlF_6^{3-}$) and hydrogen difluoride ($HF_2^-$). However, the MPSi layer quality obtained by using this method is of generally poor optical quality with strong pore wall erosion and branching.

A method of manufacturing ordered free-standing MPSi arrays, including pore walls coated by a semiconducting layer with follow-on oxidizing or nitriding through a CVD process was disclosed in U.S. Pat. No. 5,544,772 issued Aug. 13, 1996 to R. J. Soave, et al., in relation to the production of microchannel plate electron multipliers. N-doped silicon wafers, photoelectrochemically etched in an HF-based aqueous electrolyte, were disclosed. Another method of manufacturing MPSi-based microchannel plate electron multipliers is disclosed in U.S. Pat. No. 5,997,713 issued Dec. 7, 1999 to C. P. Beetz et al. This patent describes an ordered, freestanding MPSi array made by the electrochemical etching of a p-doped silicon wafer. Both aqueous and non-aqueous (e.g., acetonitrile, tetrabuthylsulfoxide, propylene carbonate or metholene chloride-based) electrolytes based on both HF and fluoride salts were disclosed for MPSi layer manufacturing. Covering the pore walls of a freestanding MPSi array with a dynode and insulating materials through CVD, sol-gel coating, electrolytic deposition, electrodeposition and electroless plating were disclosed. The use of mechanical grinding, polishing, plasma etching or chemical back-thinning to remove the remaining part of the silicon wafer in line with the pores were disclosed. The use of a surfactant to improve pore quality was also taught. However, such methods are related to just a straight pore MPSi arrays, thus not suitable for IR spectral filtering.

The use of a conductivity-promoting agent in organic-based electrolytes (e.g., DMF) during the photoelectrochemical etching of n-doped silicon was disclosed in S. Izuo et al., *Sensors and Actuators* A 97–98 (2002), pp. 720–724. The use of isopropanol (($CH_3$)$_2$CHOH) as a basis for an organic electrolyte for electrochemical etching of p-doped silicon was disclosed in, for example, A. Vyatkin et al., *J. of the Electrochem. Soc.*, 149 (1), 2002, pp. G70–G76. The use of ethanol ($C_2H_5OH$) to reduce hydrogen bubble formation during electrochemical etching of silicon as an addition to aqueous HF-based electrolytes was disclosed in, for example, K. Barla et al., *J. Cryst. Growth*, 68, p. 721 (1984). Completely filling the pores with silicon dioxide or doped silicon dioxide through CVD, particularly to create optical waveguides (similar to optical fibers in structure) for integrated circuit interconnects was disclosed in U.S. Pat. No. 6,526,191 B1 issued Feb. 25, 2003 to Geusic et al. A detailed review of the various aspects of MPSi formation can be found in H. Föll et. al, *Mat. Sci. Eng.* R 39 (2002), pp. 93–141.

In addition to silicon, macropores have been obtained in other types of semiconductor and ceramic materials. Macropores obtained in n-type GaAs by electrochemical etching in acidic electrolytes (aqueous HCl-based) were reported by, for example, D. J. Lockwood et al., *Physica E*, 4, p. 102 (1999) and S. Langa et al., *Appl. Phys. Lett.* 78(8), pp. 1074–1076, (2001). Macropores obtained in n-type GaP by electrochemical etching were reported by B. H. Erne et al., *Adv. Mater.*, 7, p. 739 (1995). Macropore formation during the electrochemical etching of n-type InP (in aqueous and organic solutions of HCl and mixtures of HCl and H$_2$SO$_4$) was reported by P. A. Kohl et al., *J. Electrochem. Soc.*, 130, p. 228 (1983) and more recently by Schmuki P et al., *Physica Status Solidi* A, 182 (1), pp. 51–61, (2000); S. Langa et al., *J. Electrochem. Soc. Lett.*, 3 (11), p. 514, (2000). Macroporous GaN formation during electrochemical etching was reported by J. v. d. Lagemaat, Utrecht (1998). Macropore formation during electrochemical etching of Ge was reported by S. Langa et al., *Phys. Stat. Sol.* (A), 195 (3), R4–R6 (2003). Reviews of macropore formation in III-V semiconductors can be found in H. Föll et al., *Phys. Stat. Sol. A,* 197 (1), p. 64, (2003); M. Christophersen et al., *Phys. Stat. Sol. A,* 197 (1), p. 197, (2003), and H. Föll et al., *Adv. Materials, Review,* 2003, 15, pp. 183–198, (2003).

Spectral filter technology have not yet been practically demonstrated in any porous semiconductor material other than silicon. Ordered pore arrays were reported for n-doped InP (S. Langa et al., *Phys. Stat. Sol A,* 197 (1), p. 77, (2003)), but in that context the order which was obtained was due to self-organization rather than due to pore formation in pre-determined locations. No post-growth coating of the pore walls was disclosed, nor was intentional pore cross-section modulation investigated.

In addition to electrochemical etching, other methods of producing pore-like structures are known to those skilled in the art. As an example, deep Reactive Ion Etching (DRIE) has been used to produce relatively high aspect ratio hole structures with CVD-deposited diamond coated walls for microchannel plate electron multipliers (see, for example, U.S. Pat. No. 6,521,149 issued Feb. 18, 2003 to Mearini et al.). Such structures are also made freestanding by backside removal of the silicon through grinding, polishing or etching. Various methods of filling high vertical aspect ratio structures (used in integrated circuit chip manufacturing) by various materials can be found in U.S. Pat. No. 5,645,684 issued Jul. 8, 1997 to C. G. Keller.

Exemplary New Spectral Filter Designs

We provide in one non-limiting illustrative exemplary arrangement, an improved near IR, mid IR or far IR filter configuration based on a substantially uniform array of waveguides made of porous semiconductor (where pores are straight and non-branching). Further, the pore cross sections are modulated at least along part of their depths while other parts may be left unmodulated, or the entire depths can be modulated.

Such spectral optical filters can be used for band-pass, narrow-band pass or band blocking spectral filtering, and provide significant advantages. Exemplary advantages of particular implementations include, but are not limited to:

Omnidirectionality, i.e., absence of spectral shape dependence of transmission (for transmission type optical filters) or reflection (for reflection type optical filters) spectra on the angle of light incidence within the acceptance angles of the filter. Manufacturability (i.e., the ability to fabricate such filters relatively simply and inexpensively compared to the other filter configurations known by those skilled in the art).

The absence of material delamination problems as found with multilayer interference filters.

Exemplary non-limiting configurations are based on the formation of a large number of identical, mutually de-coupled waveguides arranged with respect to each other such that the transmission through the array is possible mainly through at least one of the waveguide modes of the assembly of waveguides. The transmission or reflection spectrum of each of said waveguides is wavelength dependent due to modulation of the waveguide cross-sections and can be tuned to the desired spectral shape and position by modifying the structure of said pore cross-section modulation. In addition, one or both broad faces of the filter containing the waveguide ends can be covered by an anti-reflective coating such as, for example, a single layer of transparent dielectric material of quarter-wavelength thickness and refractive index close to the square root of the refractive index of said waveguide material or, alternately covered by dielectric multilayer coatings. These coatings, covering the broad faces of the non-pore material forming the waveguide ends, suppress the coupling and/or outcoupling losses, thus increasing the transmittance of such filters within the pass band of said filters.

A waveguide array can be formed in a semiconductor wafer in the form of channels going through the wafer (semiconductor islands between the pores). Such a structure can be fabricated, for example, by forming the porous semiconductor layer by means of electrochemical or photo-electrochemical etching of a single crystal semiconductor wafer as deeply as necessary (waveguide lengths chose by design). By this procedure, a porous semiconductor layer is made with the pores extending at least partially through the semiconductor. Semiconductor islands between pores formed by such a process will serve as waveguides at wavelengths within the transparency range of said semiconductor, while the pores will reduce the coupling between the waveguides. The modulation of the cross sections of the waveguides can be achieved through modulating the pore diameters along their depths by modulating the electrochemical etching parameters during the electrochemical etching process.

For example, the parameters available for modulation include the current density, illumination intensity or other parameters known to those skilled in the art. Said semiconductor material can be silicon (p-type doped or n-type doped), gallium arsenide, indium phosphide, or any other material that can be shown to form straight pores during electrochemical etching in a suitable electrolyte and under suitable conditions. In order to suppress the cross coupling between the waveguides and to reinforce the structure mechanically, the pore walls can be coated by a layer of material that is substantially transparent within the pass band of the filter and that has a lower refractive index than said semiconductor. Such a layer may serve as a waveguide cladding. The covering of the pore walls can be achieved by partial thermal oxidation of a semiconductor (principally silicon), or by depositing a dielectric single layer or multilayer onto the pore walls by Chemical Vapor Deposition or by any other deposition, sputtering, evaporation or growth process known to those skilled in the art. Covering the substrate or wafer surface (or surfaces) between the pores by an antireflective structure can be accomplished by directional deposition techniques, such as physical vapor deposition, magnetron sputtering, thermal or electron beam evaporation, ion assisted ion plating or any other technique known to those skilled in the art. If the filter structure is too fragile for its intended use, the porous layer can be reinforced by sealing between two plates of a material that is transparent over the transparency wavelength range of the porous filter or a wider range. Such plates can be, for instance, of glass, silica, or any other transparent dielectric known to those skilled in the art.

In order to suppress the transmission in the porous layer through channels other than the waveguiding channels of transmission, the pore walls can be coated by a layer of absorptive or reflective material, at least over some length along the pores. More over, the pores can be completely filled by an absorptive and/or reflective material or materials. Metal can serve as a nonlimiting example of such an absorptive or reflective material. In such a spectral filter configuration, the use of the transparent cladding layer disclosed in the previous paragraph is strongly desired to minimize the waveguide losses associated with the introduction of said absorptive or reflective layer onto the pore walls. Said pore wall coating by an absorptive and/or reflective layer can be accomplished by chemical vapor deposition, atomic layer deposition or any other method known to those skilled in the art. Said complete filling of the pores with an absorptive and/or reflective material may be accomplished by chemical vapor deposition, injection molding, dye casting, capillary absorption of a liquid into the pores or by any other method known to those skilled in the art.

The pores can be disposed across the broad surfaces of the wafer or substrate with a predetermined pattern having a predetermined simple symmetry (for example, cubic or hexagonal). Alternatively, said pores can be disposed into a pattern having more complex symmetry. Additionally, the pores may have circular or near-square cross-sections.

In one exemplary illustrative non-limiting implementation, said pores (and through that the silicon island waveguides) can be made to have tapered ends at least at one (first or second) surface of said filter, or to taper uniformly or non-uniformly along their entire lengths. At the narrow end of the taper, the pore lateral cross-section can be gradually decreased when approaching the near surface (thus the waveguide lateral cross-section is gradually increased) of the filter substrate in order to increase the coupling and/or outcoupling efficiency to improve the transmittance through the filter.

The far IR spectral range can be quite important for many applications such as the nonlimiting examples of astronomy and chemical analyses. Silicon, Ge, III-V compound semiconductors or other materials known to permit ordered pore array formation through electro-chemical etching, however, are not transparent over the whole spectral range of interest. Hence, some modifications of the spectral filter design may be made to serve these applications. According to another exemplary illustrative non-limiting implementation, an improved IR filter configuration is based on a substantially uniform array of waveguides made of free-standing porous semiconductor in which the pores are straight and non-branching. Pore cross sections are either modulated at least along part of the depths while other parts are left unmodulated, or the entire depths can be modulated. The pores are filled with the material that is transparent within the spectral range of interest (nonlimiting examples of such materials include ZnSe, CdTe and thallium iodide). The pore walls may be covered by at least one layer of transparent material different from that filling the pores completely, and having smaller refractive index, prior to said filling of the pores. In this exemplary illustrative implementation, the filled pores will act as a waveguides. The material completely filling the pores acts as a waveguide core, while the material covering pore walls (if any) serves as a waveguide cladding. The porous semiconductor matrix can be oxidized before filling the pores to reduce its refractive index and through that reduce the cross coupling between neighboring waveguides. Unlike the previously described exemplary illustrative implementation, the ordering of the pore array (and through that of the waveguide array) is not strictly required. Only uniformity of the pore sizes is needed. However, ordering still can be an advantageous feature.

According to a further exemplary illustrative non-limiting implementation, the first, the second or both surfaces of said filter wafer may be coated with an antireflective structure after said pore filling to suppress the coupling and outcoupling losses. Said antireflective coating can be a single layer antireflective coating, or, alternatively, can be made in the form of a multilayer antireflective coating. The antireflective coating can be deposited through chemical or physical vapor deposition or by any other technique known to those skilled in the art. Said pore filling can be accomplished by chemical vapor deposition, injection molding, dye casting, capillary absorption of a liquid into the pores or by any other method known to those skilled in the art.

The resulting exemplary non-limiting illustrative filters can have the advantages of stability. They do not exhibit vulnerability to delamination of the different materials and offer remarkable stability over wide range of temperatures and large temperature gradients. They also offer transmittance comparable to that of prior art narrow bandpass, bandpass and band blocking filters combined with omnidirectionality, i.e. independence of the spectral position of the filtering feature (e.g., reflection band, transmission valley or transmission edge) on the angle of incidence. Such filters are useful for a wide variety of applications, including applications where currently available filter systems cannot provide acceptable performance (e.g., a variety of analytical devices, wavelength division multiplexing, astronomical instrumentation, spectroscopy, etc.).

This specification also discloses exemplary non-limiting illustrative methods for manufacturing spectral filters. According to one implementation, spectral filters can be produced by:

preparing the semiconductor wafer having first and second surfaces wherein said first surface is substantially flat, and anodically etching the substrate wafer to produce a structured layer having pores with controlled depths defined at least partially therethrough, said pores having coherently modulated cross-sections at least over a part of said depth.

The porous layer can be formed through electrochemical etching of said semiconductor wafer in acidic electrolyte. The etching method may include connecting the substrate as an electrode, contacting the first surface of the substrate with an electrolyte, setting a current density (or voltage, depending on the type of semiconductor material used and type of doping of said semiconductor material used) that will influence etching erosion, and continuing the etching to form said pores extending to a desired depth substantially perpendicularly to said first surface. Said semiconductor wafer can be, but is not limited to, a silicon wafer. Preliminary depressions can be formed on the first surface of said wafer (etch pits) to control the locations of the pores to be formed in the electrochemical etching process. Said etch pits can be formed through the application of a photoresist layer on the first surface of the semiconductor wafer, photolithographically defying the pattern of openings and chemically or reactive ion etching the etch pits through said openings. Alternatively, said etch pits can be formed by depositing a material layer with different chemical properties than that of the substrate by means of chemical or physical vapor deposition, thermal oxidation, epitaxial growth, sol-gel coating or any other technique known to those skilled in the art. A further step may be the application of a photoresist layer on the top of said material, photolithographically defining the pattern of openings in the photoresist layer, transferring said patterns into said layer through chemical or reactive ion etching and transforming the resultant pattern into a corresponding etch pit pattern through chemical or reactive ion etching. Said layer of material with different chemical properties than that of the substrate wafer may then be removed through chemical etching, reactive ion etching or any other method known to those skilled in the art, or may not be removed.

More specifically, said semiconductor wafer can be an n-doped, (100) orientated silicon wafer. The electrolyte can be in this case an HF-based aqueous acidic electrolyte. Alternatively, the electrolyte can be an HF-based organic electrolyte. Alternatively, said semiconductor wafer can be a p-doped, <100> oriented silicon wafer. The electrolyte in this case may be HF-based organic electrolyte. The electrolyte may contain hydrofluoric acid in a range of 0.5% to 50%, but preferably 2 to 10% by volume. A second surface of the substrate wafer that lies opposite the first surface may be illuminated during electrochemical etching. The electrolyte may additionally contain an oxidation agent, a hydrogen reducing agent (e.g., selected from the group of chemicals consisting of mono functional alkyl alcohols, tri functional alkyl alcohols), a viscosity increasing agent, a conductivity-modifying agent, and/or other organic and inorganic additives. One or more of the electrochemical process parameters such as current density (for p-doped Si wafers), applied voltage, electrolyte temperature and/or illumination intensity (for n-doped Si wafers) can vary in a predetermined fashion during the pore growth process to provide the pores with needed variations in cross section. As a further alternative, said semiconductor wafer can be of material chosen from the full possible range of alloys and compounds of zinc, cadmium, mercury, silicon, germanium, tin, lead, aluminum, gallium, indium, bismuth, nitrogen, oxygen, phosphorus, arsenic, antimony, sulfur, selenium and tellurium. The electrolyte may be an acidic electrolyte with the acid suitably chosen for pore formation in the particular semiconductor material.

According to another non-limiting illustrative arrangement, the completed porous structure is sealed from the porous side by a plate transparent in the spectral range of interest. Further, according to another aspect of the same arrangement, at least one of the first or second surfaces of said semiconductor wafer containing a porous layer is coated by an antireflective structure.

According to a further illustrative non-limiting method of manufacturing a spectral filter, the filter can be produced by:
preparing a semiconductor wafer having first and second surfaces wherein said first surface is substantially flat, and
anodically etching the substrate wafer to produce a structured layer having pores with controlled depths defined at least partially therethrough, said pores having coherently modulated cross-sections at least over a part of said depth,
removing the un-etched part of said wafer at the ends of the pores, and
coating the pore walls with at least one layer of transparent material.

The first and the second steps of this illustrative non-limiting method of manufacturing a spectral filter are the same as those of the previous illustrative method described above.

Said removal of the unetched part of the wafer can be performed through grinding, polishing, chemical-mechanical polishing, chemical etching, reactive ion etching or any other method known to those skilled in the art.

Said coating of the pore walls with at least one layer of transparent material can be accomplished through chemical vapor deposition, thermal oxidation, liquid immersion or any other method known to those skilled in the art.

According to another non-limiting exemplary illustrative arrangement, the porous structure so obtained is sealed between two transparent plates. At least one surface of the porous layer can be coated by an antireflective structure.

A further exemplary illustrative non-limiting method of manufacturing a spectral filter can be accomplished by:
preparing the semiconductor wafer having first and second surfaces wherein said first surface is substantially flat, and
anodically etching the substrate wafer to produce a structured layer having pores with controlled depths defined at least partially therethrough, said pores having coherently modulated cross-sections at least over a part of said depth,
removing the un-etched part of said wafer at the ends of the pores, DON'T WE coating the pore walls with at least one layer of transparent material, and
coating the pore walls with at least one layer of absorptive and/or reflective material.

The first, second, third and fourth steps of this illustrative non-limiting method of manufacturing a spectral filter are the same as those of the previous illustrative method described above. Said coating of the pore walls with at least one layer of absorptive and/or reflective material may be performed through a chemical vapor deposition technique as one non-limiting example. Alternatively, the pores can be completely filled by said absorptive and/or reflective material. Said pore filling can be accomplished by chemical vapor deposition, injection molding, dye casting, capillary absorption of a liquid into the pores or by any other method known to those skilled in the art.

A further exemplary illustrative non-limiting method of manufacturing a spectral filter can be accomplished by:
preparing a semiconductor wafer having first and second surfaces wherein said first surface is substantially flat, and
anodically etching the substrate wafer to produce a structured layer having pores with controlled depths defined at least partially therethrough, said pores having coherently modulated cross-sections at least over a part of said depth,
removing the un-etched part of said wafer at the ends of the pores,
Thermally oxidizing said porous layer coating the pore walls with at least one layer of transparent material serving as a waveguide cladding, and
filling the pore walls with at least one layer of transparent material serving as a waveguide core.

The first, second, third and fifth steps of this illustrative non-limiting method of manufacturing a spectral filter are the same as those of the previous illustrative method described above. Said thermal oxidation may be performed by placing the porous layer into an oxidation furnace with a temperature in the range of 900 to 1400° C. in an ambient atmosphere of dry oxygen atmosphere or wet oxygen. Said filling of the pore walls with at least one layer serving as a waveguide core can be performed through a chemical vapor deposition technique as one non-limiting example.

BRIEF DESCRIPTION OF THE DRAWINGS

These and other features and advantages provided by exemplary non-limiting illustrative implementations will be better and more completely understood by referring to the following detailed description in connection with the drawings, of which.

DETAILED DESCRIPTION

An exemplary illustrative non-limiting spectral filter comprises a porous semiconductor wafer having pores regularly arranged and coherently modulated through at least part of their depths and having at least one layer of optically transparent material optionally covering the pore walls and an antireflection structure covering optionally first, second or both surfaces of the filter.

Figure 3A:
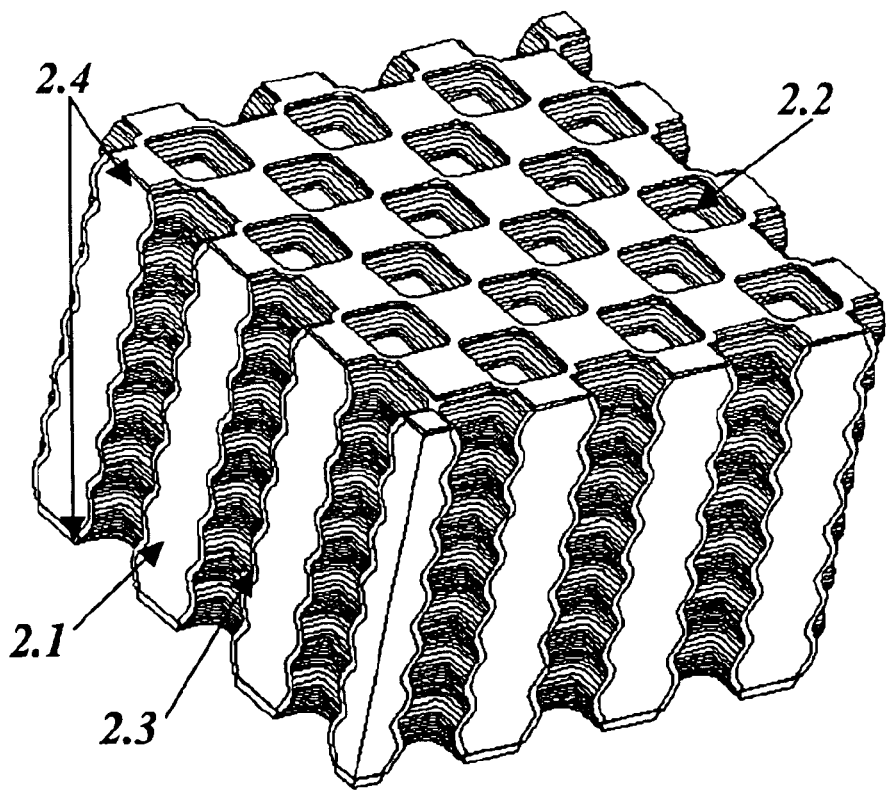
FIG. 3*a* is a diagrammatic perspective view of a non-limiting, illustrative exemplary implementation of a freestanding uniform pore array section of a uniform cubic lattice with at least one layer of optically transparent material uniformly covering the pore walls and an antireflective coating optionally covering at least one first or second surface of the filter wafer.

A simple non-limiting example of such a filter structure is an MPSi layer, the pore walls of which are covered with just one layer of transparent dielectric. A diagrammatic perspective view of an exemplary illustrative non-limiting spectral filter structure is shown in FIG. 3a. Such a structure includes the remaining semiconductor (e.g., silicon) host 2.1 remaining after pore etching that serves as an array of uncoupled waveguide cores surrounded by pores 2.2 with coherently modulated diameters arranged in a uniform cubic lattice, further incorporating a layer of transparent dielectric material 2.3 uniformly covering the pore walls serving as a waveguide cladding and an antireflective coating on either one or both surfaces 2.4 of the filter to suppress the coupling and outcoupling losses.

Layer 2.3 can be of silicon dioxide ($SiO_2$), thermally grown silicon dioxide ($SiO_x$), CVD-deposited silicon nitride ($Si_3N_4$) or any other material known to those skilled in the art sufficiently that is transparent at the operational wavelengths of the filter and possesses a refractive index considerably less than that of semiconductor host 2.1. Layer 2.3 and antireflective structure 2.4 can be deposited, grown, sputtered or disposed by any method known to those skilled in the art.

An example, non-limiting illustrative method to fabricate such a structure is to utilize silicon as the substrate and to uniformly cover all the pore walls with a well-controlled thickness of thermal oxide. This can be accomplished by the thermal oxidation of the porous layer at 800–1300° C. This approach is feasible for filters having operating wavelengths in the 1100–2200 nm spectral range. Above that range, silicon dioxide may become opaque, while below it silicon becomes opaque. For other spectral ranges, different choices of material 2.3 should be considered.

Figure 3B:
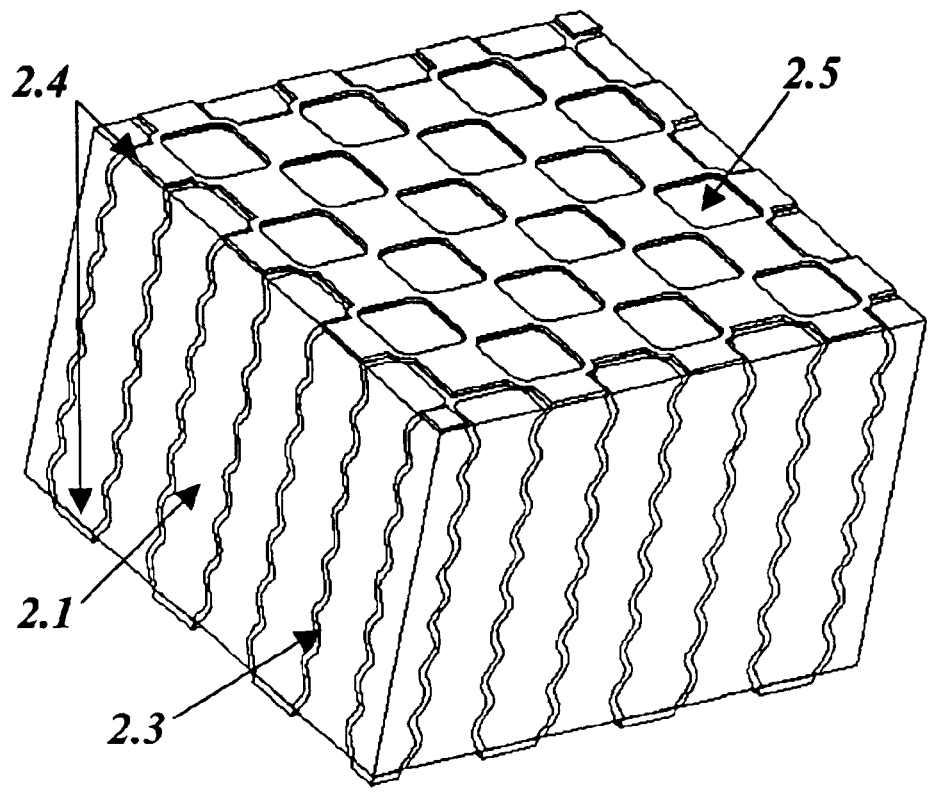
FIG. 3b is a diagrammatic perspective view of a non-limiting, illustrative exemplary implementation of a free-standing uniform pore array section of a uniform cubic lattice with at least one layer of optically transparent material uniformly covering the pore walls, a layer of absorptive or reflective material at least partially filling the pores and an antireflective coating optionally covering at least one surface of the filter wafer.

The pores in said semiconductor wafer may be filled with reflective or absorptive material to suppress the cross-coupling between neighboring waveguides even further and to suppress non-waveguiding channels of transmission through the filter. A diagrammatic perspective view of such an exemplary illustrative spectral filter structure is shown in FIG. 3b. Such a structure consists of:

a semiconductor host 2.1 serving as an array of uncoupled waveguide cores, coherently modulated pores arranged in a uniform cubic lattice, a layer of transparent dielectric material 2.3 uniformly covering the pore walls and serving as a waveguide cladding, a layer of absorptive or reflective material 2.5 at least partially filling the pores and an antireflective coating on either one or both surfaces of the filter 2.4 suppressing the coupling and outcoupling losses.

Equally as in the previous example, the layer 2.3 can be of thermally grown silicon dioxide ($SiO_2$), deposited silicon oxide ($SiO_x$), deposited silicon nitride ($Si_3N_4$) or any other material known to those skilled in the art sufficiently transparent at the operational wavelengths of the filter that possesses a refractive index considerably less than that of semiconductor host 2.1. Layer 2.3 and antireflective structure 2.4 can be deposited, grown, sputtered or disposed by any other method known to those skilled in the art. Filling of the pores with said absorptive or reflective material 2.5 can be accomplished, for example, by electroplating or electroless plating of metal through the pores (Ni, Cr, Co, Fe, Cu or any other metal or metal alloy with electroplating process known to those skilled in the art). Alternatively, said filling of the pores can be accomplished, for example, by the dipping of the porous semiconductor layer into a metal or metal alloy melt at a temperature below both the silicon and the dielectric layer 2.3 melting, alloying or chemical reactivity points. Other layers of different or the same materials deposited by different or the same methods known by those skilled in the art can be used instead or in combination. Antireflective coating 2.5 is preferentially deposited after the pores have been filled by absorptive or reflective material and can be accomplished by chemical or physical vapor deposition, spin coating, evaporation or any other technique known to those skilled in the art.

The overall performance of a spectral filter is determined by the particular pore array geometry (i.e., by the relationship between the wavelength of light, the pore diameter, the pore diameter modulation period and amplitude, the pore-to-pore distance, etc.), the pore array symmetry, the refractive indices and thicknesses of materials comprising said spectral filter.

Figure 4A:
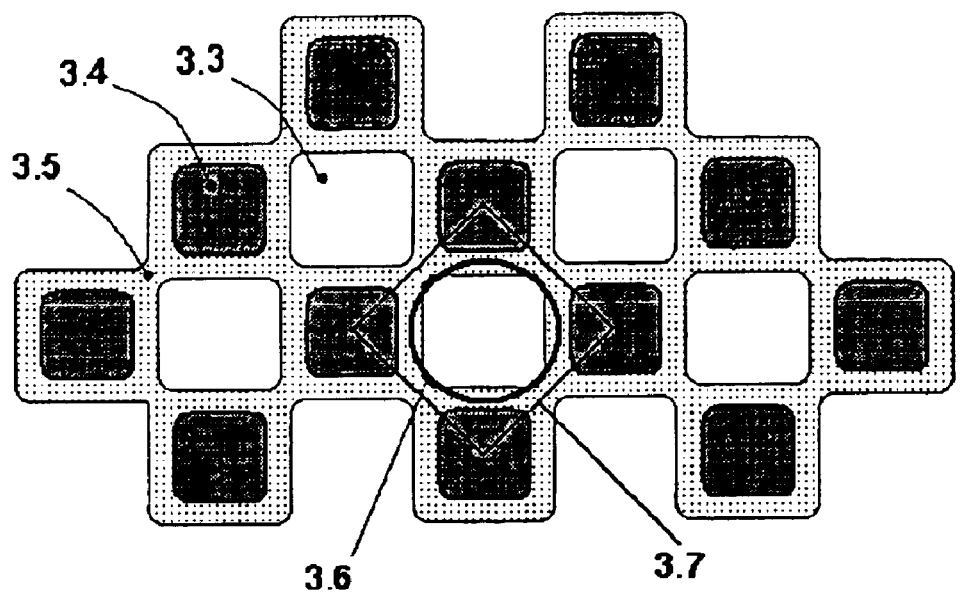
FIG. 4a is a schematic view of an exemplary illustrative uniform pore array cross-section (the pore array is a uniform cubic lattice with near-square pores, with a layer of optically transparent material uniformly covering the pore walls and with the pores optionally filled with an absorptive or reflective material).
Figure 4B:
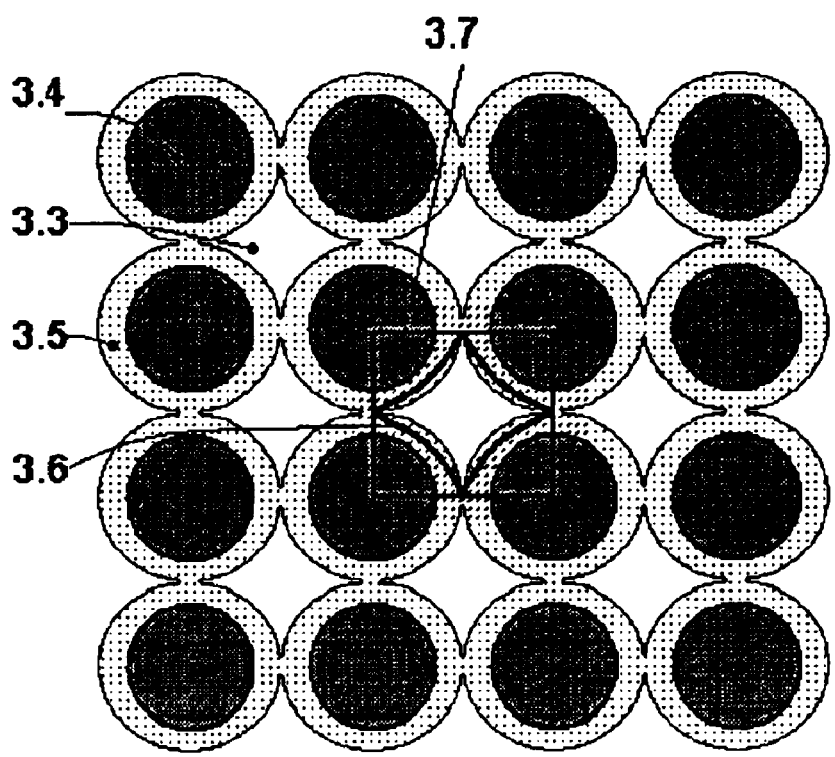
FIG. 4b is a schematic view of an exemplary illustrative non-limiting uniform pore array cross-section (the pore array forms a uniform cubic lattice with circular pores, incorporates a layer of optically transparent material uniformly covering the pore walls and with the pores optionally filled with an absorptive or reflective material).
Figure 4C:
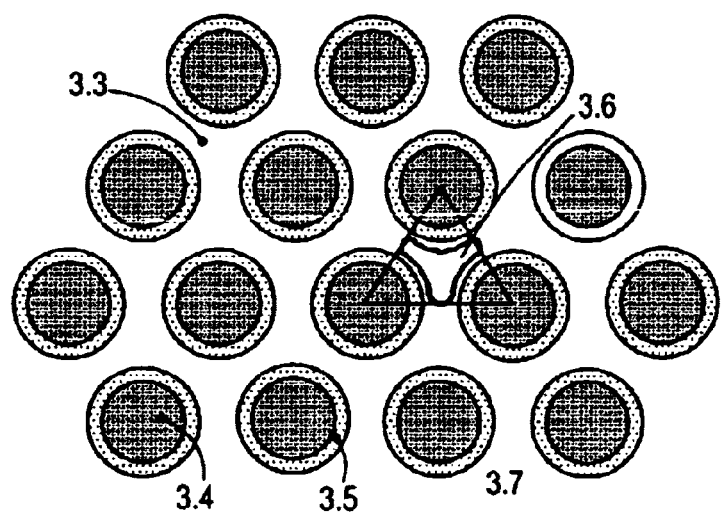
FIG. 4c is a schematic view of an exemplary illustrative non-limiting uniform pore array cross-section (the pore array forms a uniform hexagonal close-packed lattice with circular pores, with a layer of optically transparent material uniformly covering the pore walls and with the pores optionally filled with an absorptive or reflective material).

As is known to those skilled in the art, the pore array symmetry can vary over quite a wide range for porous semiconductors made by electrochemical etching, since said symmetry is to a large part defined by the symmetry of etch-pits, i.e., pore starting points in the form of preliminary prepared depressions on the semiconductor surface. Moreover, it is known to those skilled in the art that semiconductor pores can be obtained with different types of cross-sections. For example, they can be circular or nearly square. Referring now to FIGS. 4a–4c, different exemplary non-limiting spectral filter cross-sections are shown in a plane perpendicular to the axes of the pores. A cubic symmetry pore array made of pores with near-square cross section is schematically shown in FIG. 4a. An illustrative waveguide mode profile 3.6 and a waveguide array unit cell 3.7 are schematically shown. Waveguide modes for each waveguide in the array will be mostly confined within the semiconductor host 3.3 due to the high refractive index contrast at the semiconductor 3.3-to-transparent low refractive index material 3.5 interface. The waveguide mode area 6 covers at least half of the waveguide array unit cell area 7. Hence, a spectral filter design that does not incorporate tapered pore ends (tapering of spectral filter will be discussed later) with an antireflective structure coating both surfaces of the filter wafer, will provide a coupling efficiency of at least 50% at the first MPSi spectral filter interface.

An exemplary cubic symmetry pore array made of pores having circular cross-sections is shown schematically in FIG. 4b. As is illustrated in the figure, the ratio of the waveguide mode area to the unit cell area is lower in this case (assuming the same thickness of cladding layer 3.5 and the same size of semiconductor island 3.3). Hence, the coupling efficiency are expected to be lower than in the previous example.

An exemplary hexagonal symmetry pore array made of pores having circular cross-section is schematically shown in FIG. 4c. The ratio of waveguide mode area 3.6 to waveguide array unit cell area 3.7 for such a pore array will be considerably less than that for the cubic symmetry MPSi array. Hence, the coupling losses for such a pore array geometry are expected to be considerably higher. An MPSi array with hexagonal macropore ordering is disadvantageous for at least many (but perhaps not all) applications.

The dimensions of the pore array (pore size and pore-to-pore distance) should be defined by symmetry and by the operational wavelength range of the filter structure. As an illustrative nonlimiting example, a band-blocking filter having a central blocking-band wavelength of 1550 nm and having the structure shown in FIG. 4a will be considered. For this illustrative example, said porous semiconductor is assumed to be porous silicon and said waveguide cladding layer is assumed be silicon dioxide. For most of the applications (but not all) a single-mode waveguide transmission is required. For a 1550 nm wavelength, this requirement means that the silicon islands should be less than ~300 nm in cross-section. If no absorptive or reflective material is used to fill the pores, the thickness of the cladding layer (silicon dioxide in this illustrative example) should be defined by just the cross-coupling and mechanical strength considerations and in some cases no cladding layer is needed at all. If an absorptive or reflective layer is used to suppress cross-coupling and non-waveguide channels of transmission, the cladding layer is required and its optimal thickness depends also on the losses caused by the introduction of said absorptive or reflective layer.

In one illustrative example, copper was chosen as a reflective layer. For such a filter to have optimized performance, the silicon islands should be roughly ~250–280 nm in cross-section, and the pores wall should be covered with silicon dioxide having thickness preferentially in the range of 200–300 nm. The only missing dimension, the pore-to-pore distance (which is equal to the distance between silicon islands in this illustrative pore array geometry), should be chosen based on the trade-off between cross-coupling between neighbor waveguides (silicon islands) and the maximum obtainable filter transmission (i.e., losses during the coupling and outcoupling at filter interfaces). As disclosed above Exemplary illustrative spectral filters will exhibit omnidirectional transmission or reflection if the cross-coupling between neighbor waveguides is absent. However, this does not mean that the cross-coupling should be absent completely. Rather, it means that the characteristic coupling length (which is equal to the inverse mode coupling coefficient) should be larger than the waveguide length (which is in this case the length of the coherently modulated part of the waveguide array). Since the porous semiconductor (in this illustrative example, silicon) layer thickness is usually in the 50–450 μm range, the mode-coupling coefficient should be about 180 cm$^{-1}$ (for a 50 μm MPSi layer) to 20 cm$^{-1}$ (for a 300 μm MPSi layer) or less. Such values of cross-coupling coefficient can be achieved if the silicon island separation (or pore-to-pore distance) is more than ~900 nm for copper-filled pores and more than ~1000 nm for air-filled pores. The maximum obtainable transmission through such a filter in the absence of tapered ends will be proportional to the ratio of the waveguide mode area to the unit cell area of such a pore array, which is in turn equal to the squared pore-to-pore distance (or, which is equivalent, to the silicon island-to-island distance). For the given example of the filter for metal filled pores, this ratio will be ~50% or less and ~40% or less for air filled-pores. If tapered pore ends are used, these numbers can be increased to ~70% for metal-filled pores and ~55% for air filled pores.

The effective refractive index of a semiconductor island waveguide is a function of the waveguide cross-section (and, through that, the pore cross-section). As the pore cross-section in said spectral filter structure changes, so does the effective refractive index of each waveguide mode. By creating such a modulation (see FIG. 3), a waveguide Bragg grating in each semiconductor waveguide will be formed. The transmission spectrum of each waveguide will contain a characteristic transmission valley (or reflection peak) at the wavelengths corresponding to the Bragg resonance wavelength $\lambda_B$, which can be determined according to the formula: $\lambda_B = 2n^*\Lambda$, wherein $n^*$ is the effective refractive index of the waveguide mode and $\Lambda$ is the spatial period of pore cross-section modulation. Since all the pores will be grown at the same time during the same process, the modulation will be coherent. Although the transmission (and reflection) spectral shape of a spectral filter will in some cases be similar to that of a prior art multilayer interference filter, the transmitted (and reflected) spectral shapes and central wavelength for such a spectral filter will be independent of the angle of incidence of light on the surface of the spectral filter, which will greatly enhance their technical and economic usefulness over prior art filters that do exhibit spectral shifts.

It is also possible to produce the modulation of the pore cross-sections in the form of a superimposed grating. A superimposed grating can be reduced to the linear superposition of two or more constant period pore cross sectional modulations along the length of a waveguide. Alternatively, modulation of the pore cross-section can be made in the form of a periodic modulation with at least one phase shift (or cavity) in it, wherein each of said phase shifts is equal to integer multiple of π. Spectral filters made according to such a process will exhibit a narrower band-pass transmission shape, while said transmission shape will be independent of the angle of incidence within the acceptance angle range. For an economically feasible quality of narrow band pass filter, a low level of losses near the wavelength $\lambda_B$ is desirable.

According to further aspects of non-limiting, illustrative exemplary implementations, the spectral filter possesses pores with adiabatically tapered pore cross-sections near the first and/or second surfaces of the spectral filter substrate wafer. Tapered ends provide a gradual increase of pore cross section from the value of the pore cross-section at the surface of the spectral filter wafer to the value of the pore cross-section inside the spectral filter wafer (and, through that a gradual decrease of waveguide cross section from the value of the waveguide cross-section at the surface of the spectral filter wafer to the value of the waveguide cross-section inside the spectral filter wafer). The term "adiabatically" means that the rate of change of waveguide cross-sections with depth is slow or equivalently the angle produced by the pore surface inside the tapered portion of the pore with the normal direction to the said spectral filter surface does not exceed 45°, and is preferably 10° or less. Such a tapering of waveguide ends can suppress by up to an order of magnitude the coupling and/or outcoupling losses of said spectral filter, while keeping the spectral filter mechanically robust and the cross-coupling between neighboring waveguides at a low level sufficient for omnidirectional performance.

Although the mechanism of improving the performance of spectral filters as disclosed herein is interference-based, such a spectral filter will not generally suffer from the typical disadvantages of prior art interference filters, such as the dependence of the filter Bragg feature position, reflection (or transmission) edge sharpness, reflection or transmission efficiency and width of the reflection (or transmission) bands on the angle of incidence of the light. In a successful implementation, the non-waveguide channels of transmission will be suppressed or the measurements should be done in the far field of the filter. Such disadvantages are avoided for example because the light-to-filter coupling and outcoupling processes are independent of the filtering mechanism. Dependence of the transmission on the angle of incidence will be closer to that of absorption-based filters (e.g., Schott glass filters, colored glass filters, etc.) and will gradually decrease when the angle of incidence deviates from the normal direction within the acceptance angle of the spectral filter, while the spectral shape of the transmission spectrum and center wavelength will not change.

FIG. 5 shows exemplary, non-limiting illustrative plots comparing the numerically calculated transmission spectra through prior art narrow bandpass filter and the spectral filter based for example on the above illustrative implementations for different angles of incidence of a plane wave beam and different convergences (or divergences) of the incident beam. FIG. 5a shows the illustrative exemplary numerically calculated transmittance spectra through an interference-type, seven-cavity, narrow bandpass filter for normally incident, 110°- and 15°-tilted plane parallel beams. The wavelength shift of the pass-band edge position, as is common to all interference filters, and the degradation of the pass-band shape common to all multiple cavity interference filters, is demonstrated. FIG. 5b presents an illustrative exemplary normalized transmittance spectrum through the spectral filter with 7 cavities (similar in structure to that illustrated in FIG. 3) for normally incident, 20°- and 30°-tilted plane parallel beams. As follows from FIGS. 5a and 5b, spectral filters provide significant advantages over prior art filters and will provide the opportunity for using narrow bandpass, band-pass or band-blocking filters at different angles of incidence (±40° at least). This attribute will greatly decrease the criticality of optical alignment and provide other economic advantages.

Figure 5A:
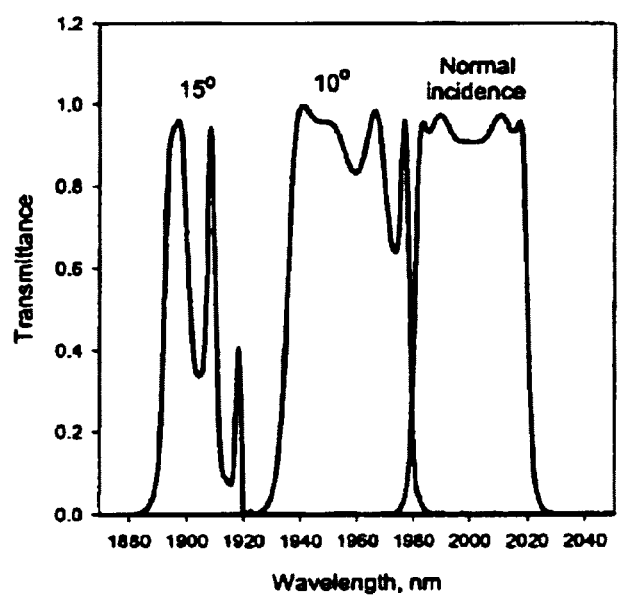
FIG. 5a is an exemplary illustrative plot of numerically calculated transmission spectra of a prior art, seven optical cavity narrow band-pass filter for different angles of light incidence.
Figure 5B:
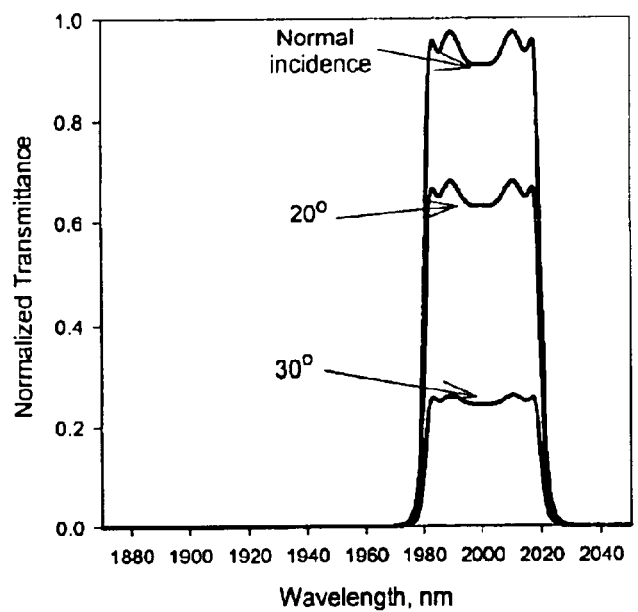
FIG. 5b is an exemplary illustrative non-limiting plot of numerically calculated transmission spectra of a new, seven optical cavity, narrow band-pass filter disclosed herein for different angles of light incidence.
Figure 5C:
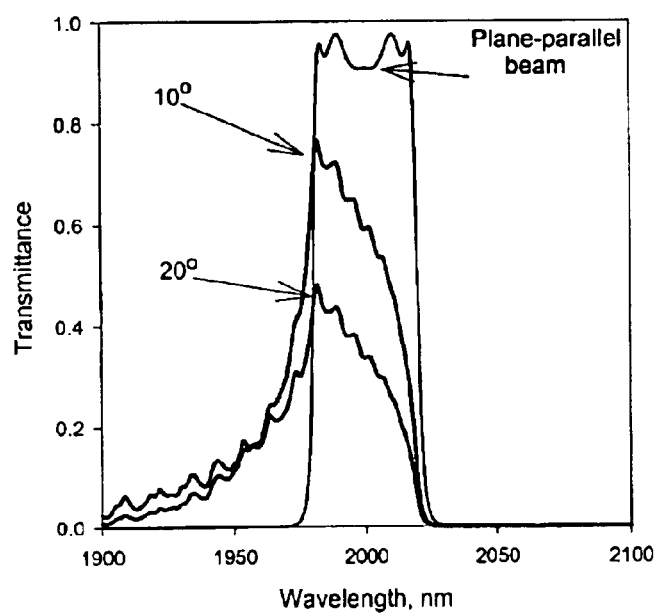
FIG. 5c is an exemplary illustrative plot of numerically calculated transmission spectra for a prior art, seven optical cavity, narrow band-pass filter for different divergences of Gaussian light beams.
Figure 5D:
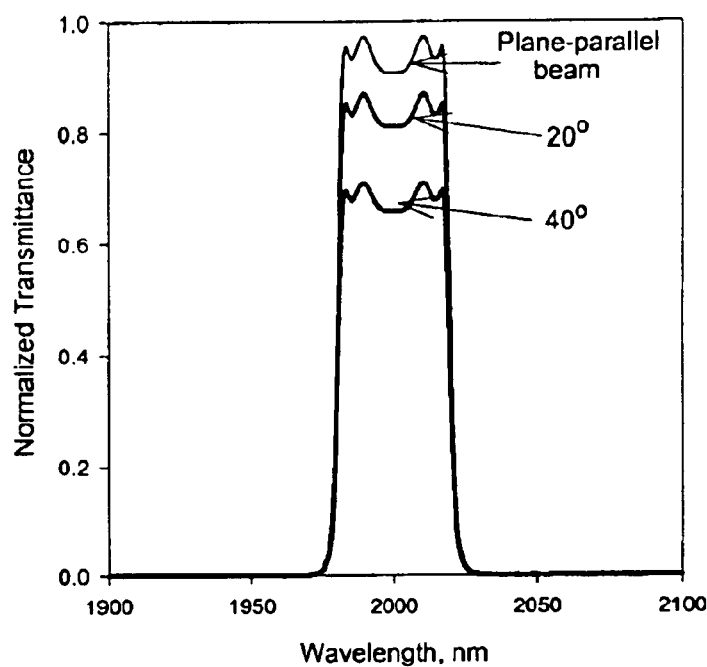
FIG. 5d is an exemplary illustrative non-limiting plot of numerically calculated transmission spectra for a new seven optical cavity, narrow band-pass filter disclosed herein for different divergences of Gaussian light beams.

FIG. 5c gives illustrative exemplary plots of numerically calculated transmittance spectra through the prior art, seven-cavity, narrow bandpass interference filter of FIG. 5a for normally incident beams with different convergences: A plane-parallel beam (0-covergence angle), and Gaussian beams with 10° and 20° convergence angles are treated. The degradation of both the band-edge shape and out-of-band rejection, common to prior art interference type, multiple-cavity, narrow bandpass filters is demonstrated. FIG. 5d presents illustrative exemplary plots of normalized transmittance spectra through the spectral filter of FIG. 5b for 0°, 20° and 40° convergent, normally incident Gaussian beams. It follows from FIG. 5 that the spectral filter will provide the opportunity to use narrow bandpass, band pass and band blocking filters with convergent or divergent beams to at least convergence or divergence angles of ±40°.

Figure 1:
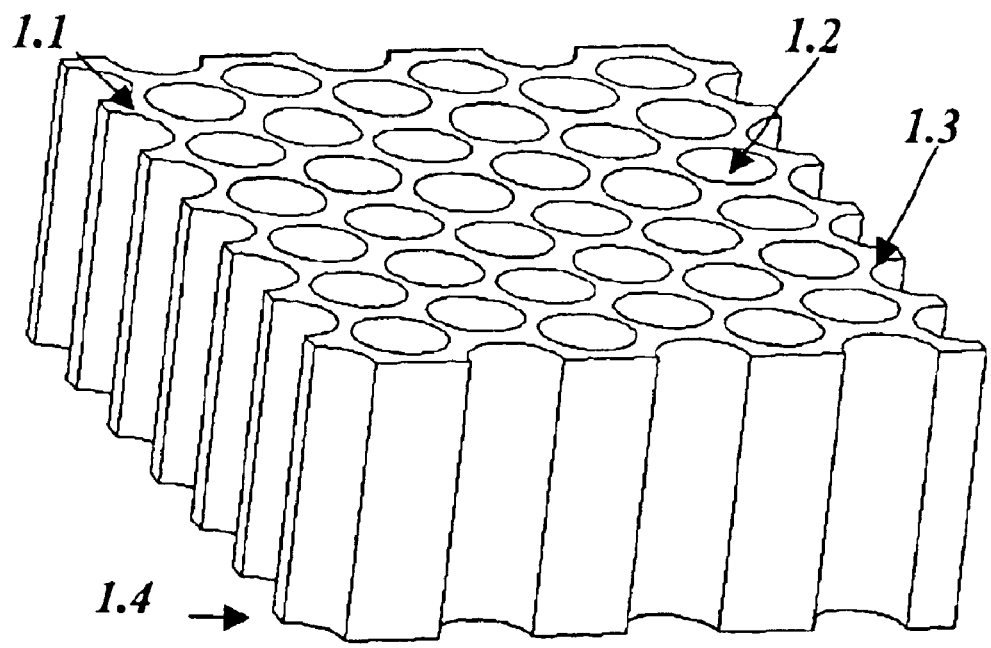
FIG. 1 is a diagrammatic perspective view of an exemplary prior art free-standing array of pores in macroporous silicon forming a uniform (i.e., coherent) cubic lattice.
Figure 2:
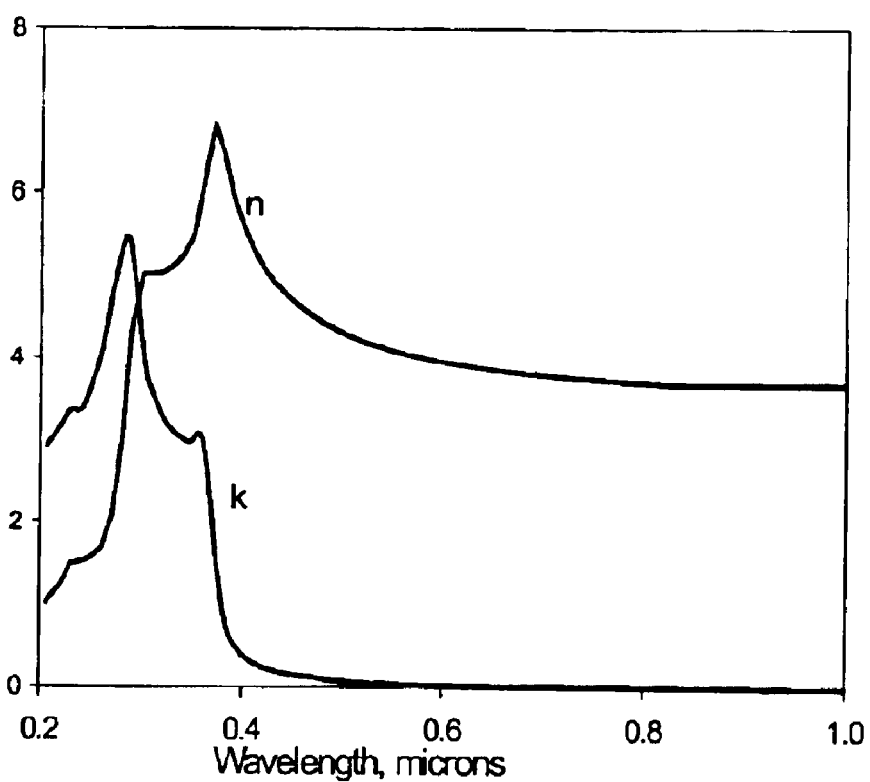
FIG. 2 is an example illustrative plot of the wavelength dependence of the real and imaginary parts of the complex refractive index of silicon in the deep UV, UV, visible and near infrared wavelength ranges.

The herein disclosed exemplary spectral filter design has significant advantages over prior art spectral filters. However, this design generally cannot be directly transferred into the visible and near IR spectral ranges (400–1100 nm wavelengths) due to the absorption of the silicon (see FIG. 2). Visible and near IR spectral ranges are of great commercial importance and efficient omnidirectional narrowband pass, band pass or band blocking spectral filters are clearly needed for these wavelengths.

Figure 6:
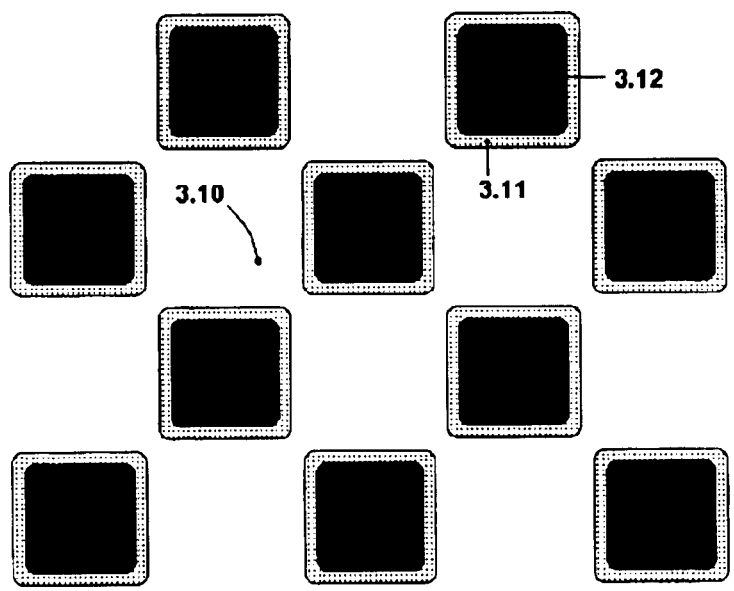
FIG. 6 is a schematic cross-sectional view of an exemplary, non-limiting illustrative free-standing, completely oxidized MPSi array with a uniform cubic lattice and incorporating near-square pores, the pores being filled with an reflective material.

According to a further exemplary non-limiting implementation, narrow bandpass, bandpass or band blocking spectral filters that are functional in the 400–2500 nm spectral range can be made by complete thermal oxidation of the free standing porous semiconductor (e.g., silicon) array having coherently modulated pore diameters, covering the pore walls by a transparent material with a refractive index lower than that of the semiconductor thermal oxide (for example, $CaF_2$) and optionally filling the pores at least partially with reflective or absorptive material. For such an exemplary spectral filter design, the thermally grown silicon dioxide will serve as the waveguide core, while the layer of low refractive index dielectric uniformly covering the pore walls will serve as a waveguide cladding. Hence, similarly to the exemplary spectral filter implementation disclosed above, the oxidized MPSi host would serve as an array of independent waveguides. Referring now to FIG. 6, an exemplary cross-sectional view of an exemplary illustrative non-limiting spectral filter is schematically shown. The thermally oxidized Si host 3.10 is coated by the layer of low index dielectric 3.11 and the pores then filled by the layer of absorptive and/or reflective material 3.12. The overall performance of such a spectral filter will be determined by the particular pore array geometry (i.e., by relation between wavelength of light, pore cross-section, pore diameter modulation, pore-to-pore distance, etc.), pore array symmetry, refractive index of the pore-filling material, and the refractive indices of the thermally oxidized thermal silicon host and the transparent layer covering the pore walls. Similarly to the previously-described arrangement, the cubic symmetry of the thermally oxidized silicon pore array is advantageous with respect to the hexagonal symmetry from the viewpoint of minimizing the coupling and outcoupling losses at the spectral filter interfaces. The dimensions of the pore array should be different from previous implementations since the waveguiding parameters are different.

Figure 7:
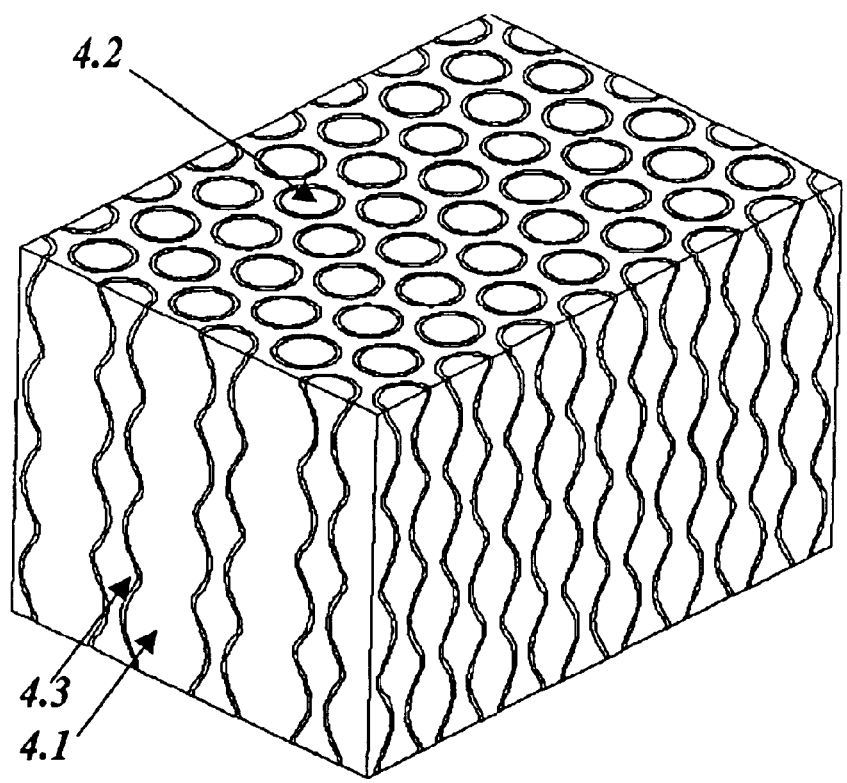
FIG. 7 is a diagrammatic view of an exemplary, non-limiting illustrative free-standing porous semiconductor array, of uniform cubic lattice and incorporating circular pores, the pores being filled with a transparent material.

According to another non-limiting exemplary illustrative arrangement, an improved narrow bandpass, bandpass and/or band blocking filter configuration is based on a substantially uniform array of waveguides made of free-standing porous semiconductor (in which the pores are straight and nonbranching). The pore cross sections are either modulated at least along part of the depths while other parts are left unmodulated, or the entire depths can be modulated. The pores are filled with a material that is transparent within the spectral range of interest (nonlimiting examples of such materials include ZnSe, CdTe and thallium iodide). Further, the pore walls may be covered by at least one layer of transparent material different from that is completely filling the pores (having smaller refractive index) prior to said filling of the pores. FIG. 7 gives an exemplary diagrammatic view of an exemplary, non-limiting illustrative free-standing porous semiconductor array of uniform cubic lattice with circular pores, and with the pores filled with a transparent material. In this implementation, the filled pores 4.2 will act as waveguides. The material completely filling the pores 4.2 acts as a waveguide core, while the material covering pore walls (if any) 4.3 serves as a waveguide cladding. Still further, the porous semiconductor matrix (e.g., silicon) may be oxidized prior to said pore filling in order to reduce it's refractive index and through that reduce the cross coupling between neighbor waveguides. Unlike the previously-described exemplary illustrative implementation, the ordering of the pore array (and through that the ordering of the waveguide array) is not strictly required. Only the uniformity of the pore sizes is required. However, ordering still may be an advantageous feature. According to another exemplary illustrative non-limiting implementation, the first, the second or both surfaces of said filter wafer may be coated with antireflective structure (not shown in FIG. 7) after said pore filling in order to suppress coupling and outcoupling losses. Said antireflective coating can be a single layer antireflective coating, or, alternatively, can be made in the form of a multilayer antireflective coating and can be deposited through chemical or physical vapor deposition or by any other technique known to those skilled in the art. Said pore filling can be accomplished by chemical vapor deposition, injection molding, dye casting, capillary absorption of a liquid into the pores or by any other method known to those skilled in the art.

For the exemplary spectral filter implementations disclosed above, simple symmetry (cubic or hexagonal) pore arrays were considered. However, to maximize the transmission (or to minimize the coupling or outcoupling losses), more complex pore arrays may be used. Examples of such pore array cross-sections are given in FIGS. 8 and 10. FIG.

8a and show an advanced hexagonal symmetry pore array comprising circular, coherently modulated pores arranged into an advanced hexagonal symmetry pattern with pore walls coated by at least one layer of transparent dielectric material. Semiconductor islands 5.1 between the pores serve as a waveguide cores in such an implementation, while the optional pore coating structure 5.2 serves as a waveguide cladding. The principle of operation (i.e., the transmission and filtering mechanisms) is the same for this structure as for the structures of the exemplary illustrative non-limiting implementations. In other words, such a spectral filter would exhibit either narrow bandpass, bandpass and/or band blocking transmission or reflection spectral characteristics combined with omnidirectionality in the same sense as described previously. If stronger cross-coupling suppression is desired for such an advanced symmetry pore array, or if further suppression of the non-waveguide channel of transmission is needed, the pores can be filled at least partially by absorptive and/or reflective material. FIG. 8b shows an advanced hexagonal symmetry pore array comprising circular coherently modulated pores arranged into an advanced hexagonal symmetry pattern with pore walls coated by at least one layer of transparent dielectric material 5.2 and with the pores at least partially filled with absorptive or reflective material 5.3. FIG. 8c shows a cross-sectional schematic view of the same pore array as that of FIG. 8b. The semiconductor waveguide mode profile 5.4 and pore array unit cell 5.5 are schematically shown. It is illustrated that for the porous semiconductor filter of FIG. 8, the ratio of waveguide mode to pore array unit cell is considerably higher than those of pore arrays having simple symmetries (as in FIGS. 3, 4 and 6). FIG. 9a shows an advanced cubic symmetry pore array comprising circular, coherently modulated pores arranged into an advanced cubic symmetry pattern with pore walls coated by at least one layer of transparent dielectric material and, optionally, pores at least partially filled with absorptive or reflective material. FIG. 9b shows a cross-sectional schematic view of the same pore array as that of FIG. 9a. The semiconductor waveguide mode profile 5.4 and pore array unit cell 5.5 are schematically shown. It is illustrated that for the porous semiconductor filter of FIG. 9, the ratio of waveguide mode to pore array unit cell is considerably higher than those of pore arrays having simple symmetries (as in FIGS. 3, 4 and 6) and higher than that of the advanced hexagonal symmetry (as in FIG. 8). As for the previously-described implementations, the first, second or both surfaces of the porous semiconductor layer may be coated by an antireflection coating to suppress coupling and/or outcoupling losses. The porous layer also can be left attached and mechanically supported by the non-porous rest of the semiconductor wafer, or, alternatively, may be made freestanding by the removal of said non-porous rest of the semiconductor wafer. The waveguide ends at the first, second or both surfaces of said porous layer can be tapered to increase the mode area around the first, the second or both surfaces of the porous layer in order to suppress coupling and/or outcoupling losses (as in previously-described implementations).

Figure 8A:
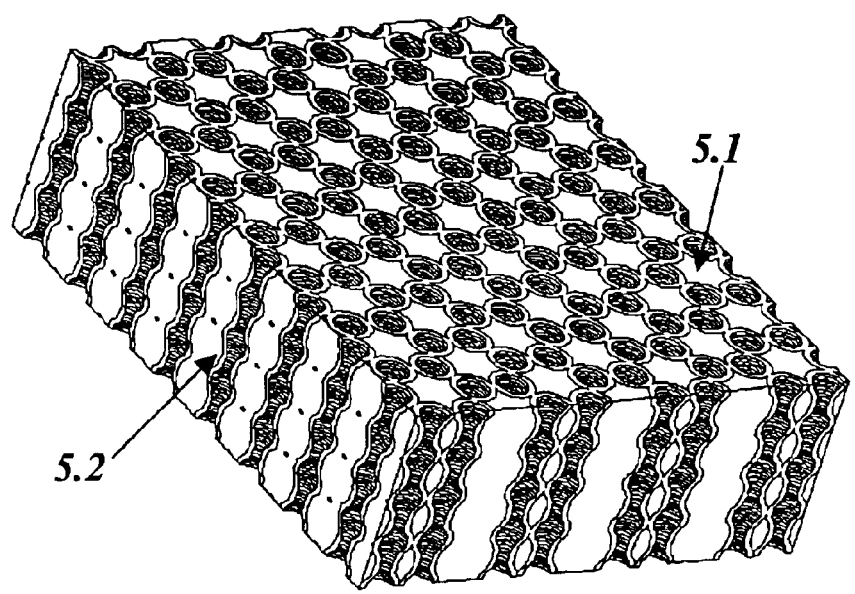
FIG. 8a is a diagrammatic perspective view of a non-limiting, illustrative exemplary implementation of a free-standing uniform pore array section of an advanced hexagonal lattice with at least one layer of an optically transparent material uniformly covering the pore walls.
Figure 8B:
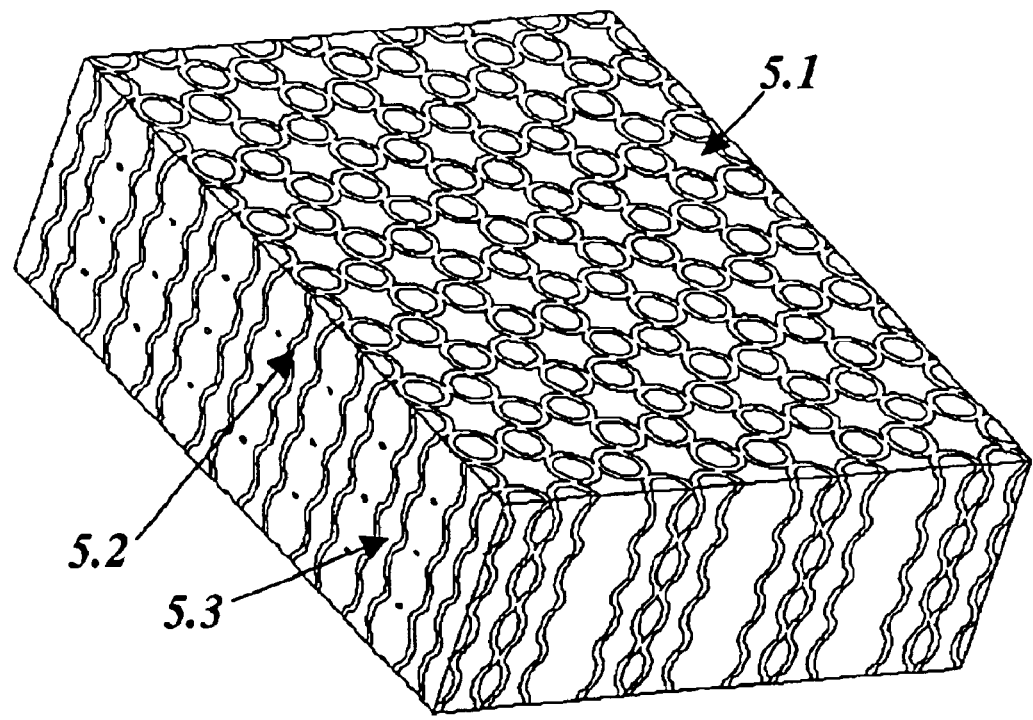
FIG. 8b is a diagrammatic perspective view of a non-limiting, illustrative exemplary implementation of a free-standing uniform pore array section of an advanced hexagonal lattice with at least one layer of optically transparent material uniformly covering the pore walls and a layer of absorptive or reflective material at least partially filling the pores.
Figure 8C:
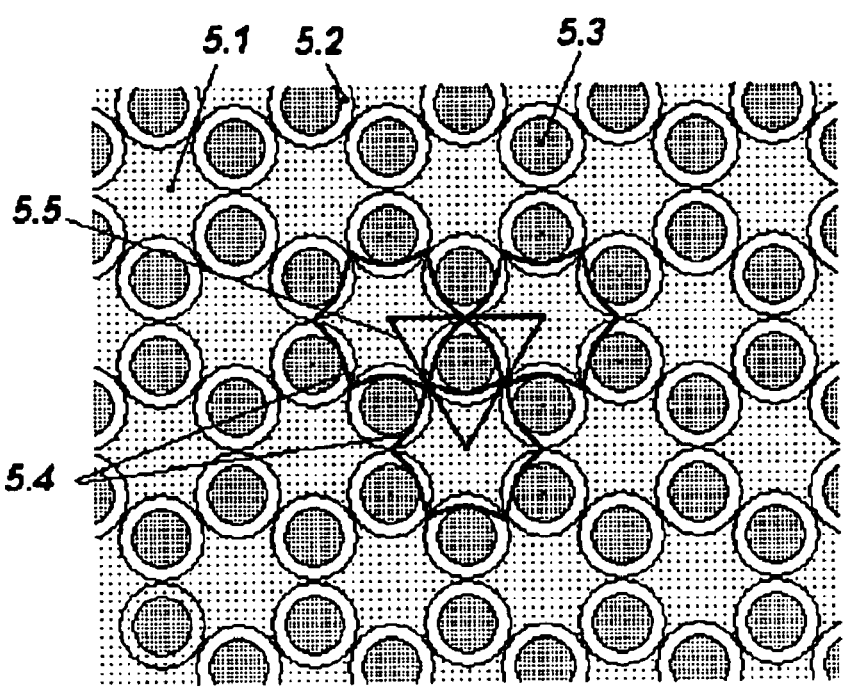
FIG. 8c is a cross-sectional schematic view of an exemplary, illustrative non-limiting uniform pore array of an advanced hexagonal lattice with circular pores, a layer of optically transparent material uniformly covering the pore walls and with the pores optionally filled with an absorptive or reflective material.
Figure 9A:
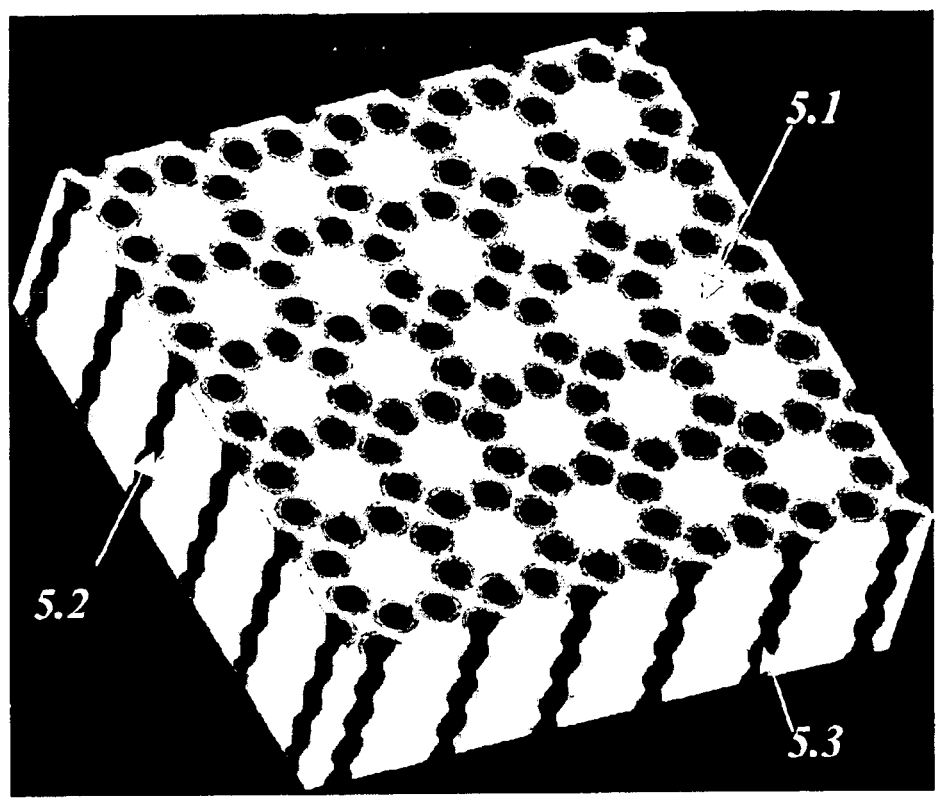
FIG. 9a is a diagrammatic perspective view of a non-limiting, illustrative exemplary implementation of a free-standing, uniform pore array section of an advanced cubic lattice with at least one layer of optically transparent material uniformly covering the pore walls and, optionally, with a layer of absorptive or reflective material at least partially filling the pores.
Figure 9B:
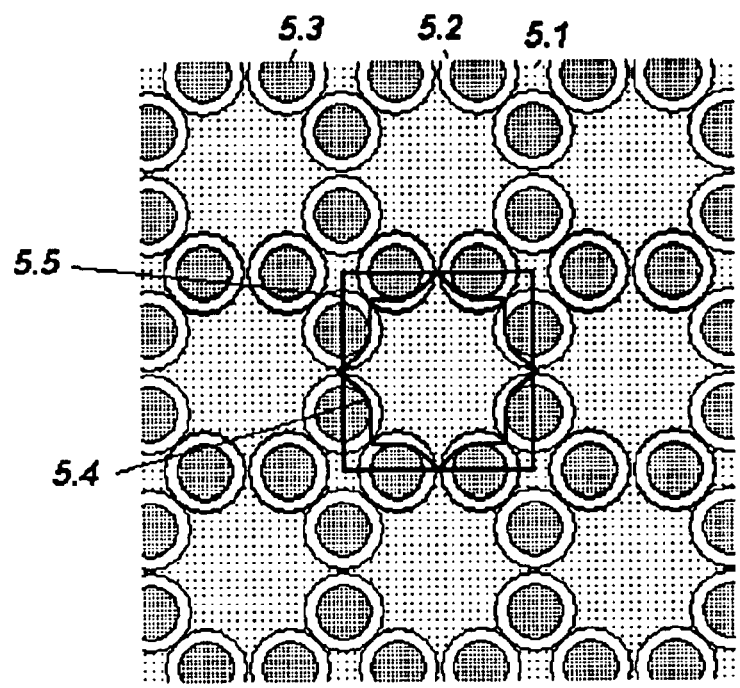
FIG. 9b is a cross-sectional schematic view of an exemplary, illustrative non-limiting uniform pore array of an advanced cubic lattice with circular pores, a layer of optically transparent material uniformly covering the pore walls and with the pores optionally filled with an absorptive or reflective material.

As an illustrative example of the advantages offered by an advanced pore array symmetry, the exemplary case of an MPSi layer having the structure of FIG. 8a will be considered in relation to spectral filtering in the optical communication band at a 1550 nm wavelength. As was taught previously in relation to previously-described implementations, for this wavelength the cross-section of the silicon islands should be less than 300 nm in order to satisfy the single-mode requirement. The size of the pores and the thickness of the silicon dioxide layer covering the pore walls should be found according to the cross-coupling suppression requirements. For example, taking the silicon dioxide thickness to be half of the pore radius, the numerical calculations show that the cross-coupling coefficient between neighboring silicon island waveguides reaches acceptable levels at a silicon island separation of 790 nm (center to center), which corresponds to pore diameters of about 180 nm and a silicon dioxide layer thickness of at least 45 nm for this particular exemplary implementation. The unit cell area for such an MPSi layer is 0.26 $\mu m^2$, while the waveguide mode area is about 0.2 $\mu m^2$. Hence the coupling losses at the first surface of an MPSi layer will be about 25% if the antireflection structure is deposited at the first surface. Tapering of the pore ends (and through that waveguide ends) may suppress coupling losses to less that 15–18%. For the MPSi layer having the structure of FIG. 8b, with Cu-filled MPSi with an $SiO_2$ layer covering the pore walls, the ratio of the waveguide mode area to unit cell area can be further increased due to higher suppression of the cross-coupling losses. For such arrays, the potential transmittance will exceed 85%, which is suitable for most of applications of IR narrowband-pass, band-pass or band-blocking filters. Advanced symmetry porous semiconductor oxide structures similar to those disclosed in the previously-described implementations may be used as functional omnidirectional narrow bandpass, bandpass and band blocking filters in the visible range (where most of semiconductors are absorptive). Such an exemplary spectral filter structure may consist of a freestanding advanced symmetry pore array having coherently modulated pore diameters in a completely thermally oxidized semiconductor (e.g., silicon) with pore walls covered by at least one layer of transparent material with refractive index lower than said semiconductor oxide and pores optionally filled with an absorptive or reflective material. In such a filter structure, the semiconductor oxide islands will serve as a waveguide cores, while said at least one layer of transparent, low refractive index material (e.g., magnesium fluoride) will serve as a waveguide cladding.

It is possible to specify several methods of fabricating the spectral filters, but it is to be understood that those familiar with the art will be able to provide variations that will work as well. According to the sequence of the process steps used, such methods can be divided into seven different implementations, as is shown in FIGS. 10a–10g. The first nonlimiting implementation of the spectral filter manufacturing methods is schematically shown as a flow chart in FIG. 10a. It consists of two main steps. Step A is to produce the etching starting points or etch pits on a wafer or substrate surface, for instance in a semiconductor. Step B is to produce a porous structure with the pores confined to the starting points defined by Step A. Other, less important, manufacturing steps can be performed in between and after these main manufacturing steps, as will be apparent from the following description.

Figure 10A:
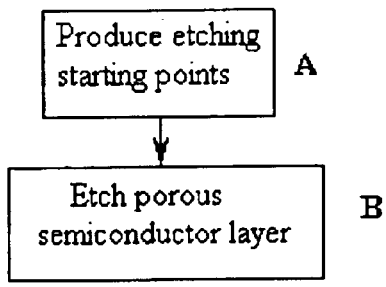
FIGS. 10a–g are exemplary, illustrative, nonlimiting flow-charts of different methods for the manufacture of spectral filters.
Figure 10B:
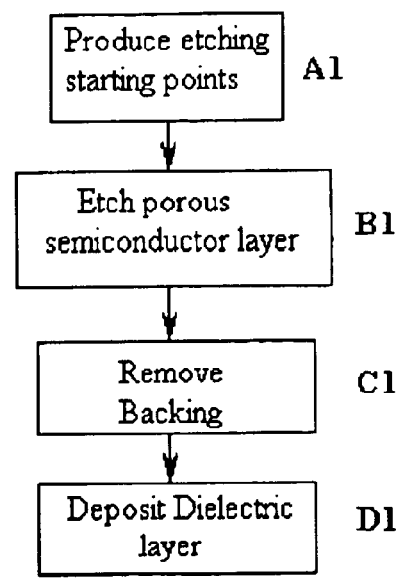

A second nonlimiting implementation of the spectral filter manufacturing methods is schematically shown as a flow chart in FIG. 10b. Steps A1 and B1 are essentially the same as Steps A and B in the first implementation shown in FIG. 10a. Step C1 is to remove the backing, i.e., to remove the unetched, non-porous part of the wafer or substrate (i.e., the part of the wafer starting from the back side that does not contain pores). Step D1 is to deposit a dielectric multilayer on the pore walls, i.e., to coat the pore walls with at least one layer of transparent material.

Figure 10C:
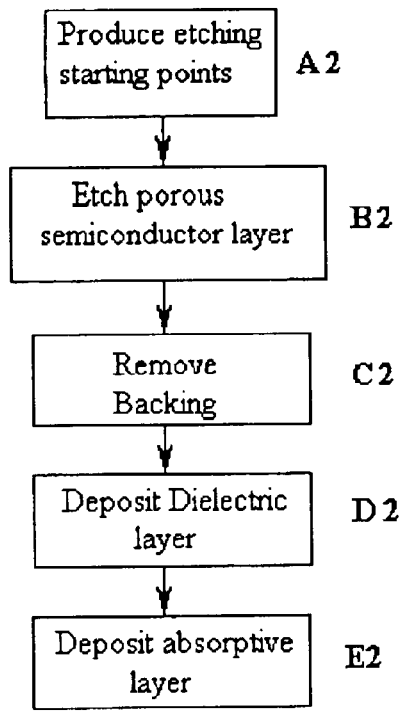

A third nonlimiting implementation of the spectral filter manufacturing methods is schematically shown as a flow chart in FIG. 10c. Steps A2–D2 are essentially the same as Steps A1–D1 in the second implementation shown in FIG. 10b. Step E2 is to deposit an absorptive and/or reflective layer on the pore walls and/or to completely fill the pores.

Figure 10D:
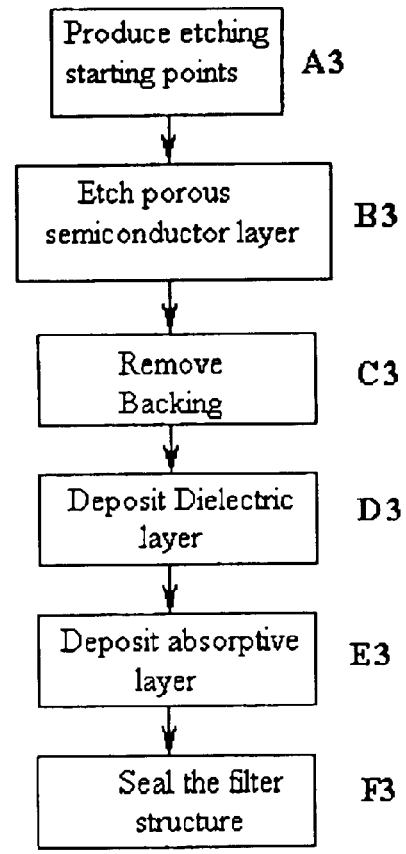

A fourth nonlimiting implementation of the spectral filter manufacturing methods is schematically shown as a flow chart in FIG. 10d. Steps A3–E3 are essentially the same as Steps A2–E2 in the third implementation shown in FIG. 10c. Step F3 is to seal the filter structure against environmental and mechanical degradation.

Figure 10E:
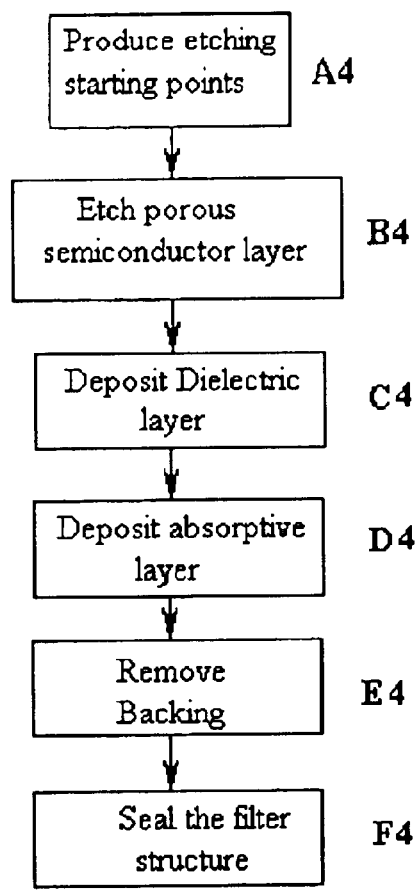

A fifth nonlimiting implementation of the spectral filter manufacturing methods is schematically shown as a flow chart in FIG. 10e. Steps A4–E4 are essentially the same as Steps A3–E3 in the fourth implementation shown in FIG. 10d except for the order of the steps. Removing the backing in such an implementation is performed right before the sealing of the filter structure.

Figure 10F:
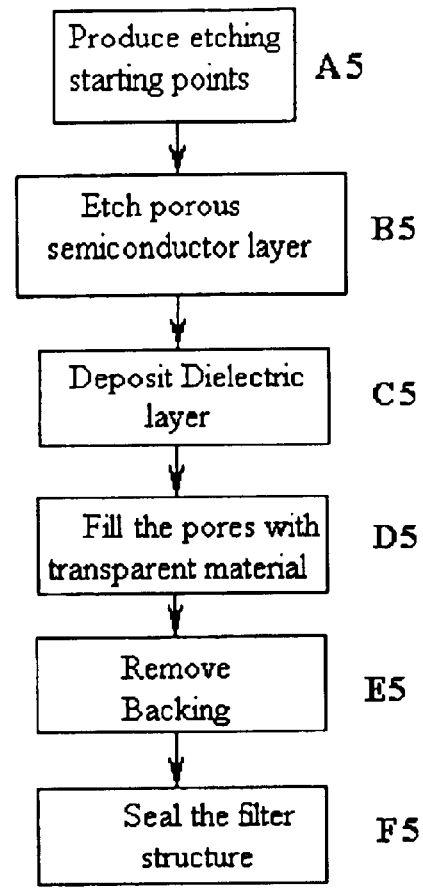

A sixth nonlimiting implementation of the spectral filter manufacturing methods is schematically shown as a flow chart in FIG. 10f. Steps A5–C5 are essentially the same as Steps A4–C4 in the fourth implementation shown in FIG. 10d. Step D5 is to fill the pores with the transparent material the refractive index of which exceeds that of the layer that coats the pore walls. Steps E5–F5 are essentially the same as in the fifth implementation of the spectral filter manufacturing methods.

Figure 10G:
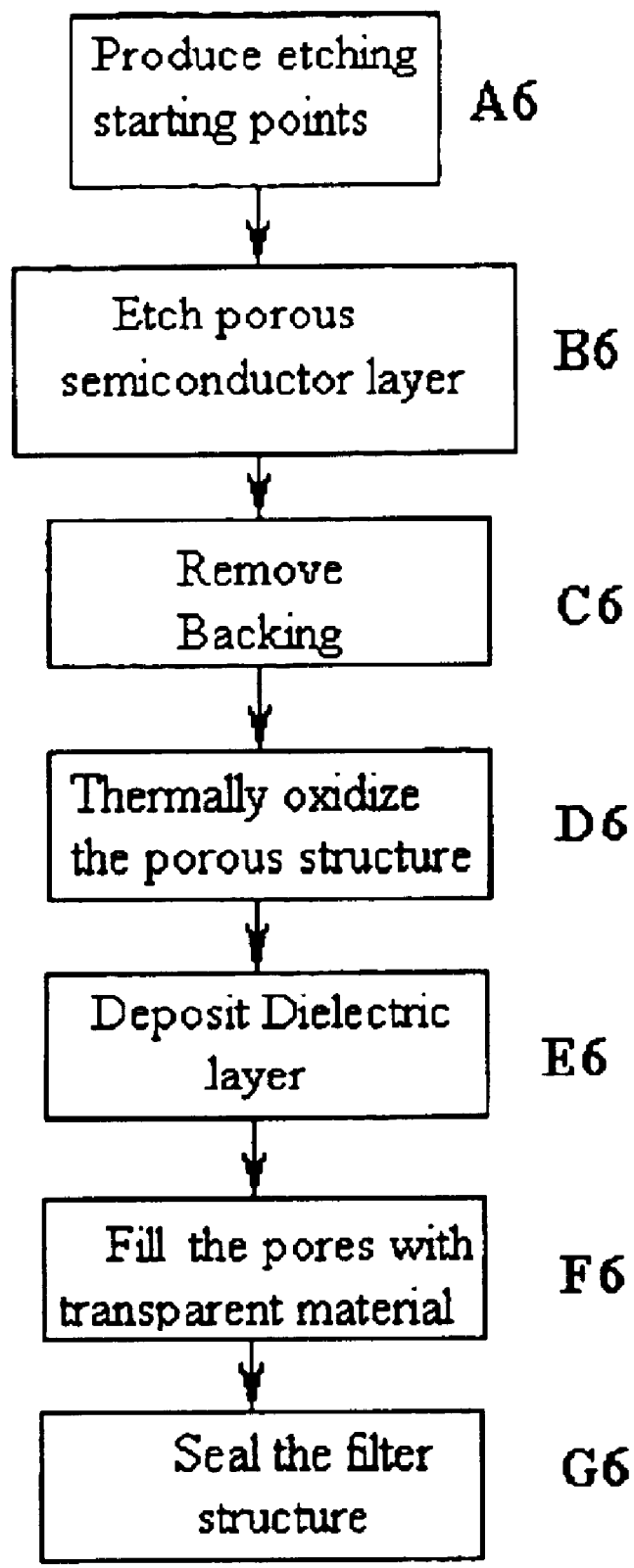

A seventh nonlimiting implementation of the spectral filter manufacturing methods is schematically shown as a flow chart in FIG. 10g. Steps A6–C6 are essentially the same as Steps A2–C2 in the third implementation shown in FIG. 10c. Step D6 is to completely thermally oxidize the porous structure. Step E5 is to deposit a layer of transparent material on the pore walls. Step F6 is to fill the pores with the transparent material whose refractive index exceeds that of the layer coating the pore walls. Step G6 is to seal the filter structure.

Since various implementations of the spectral filter manufacturing employ many similar steps but in different orders in order to obtain different results, it is worthwhile to disclose these different process sequences together.

Spectral filters can be manufactured by various techniques. However, since such filters necessarily contain very large numbers of through-pores, the most appropriate methods should provide the fabrication of all the pores comprising one filter (or group of filters on a host wafer) during one process. Several processes are well known in the art to provide pore arrays. These include but are not limited to, anodic etching of semiconductors Si, InP, GaAs, and others. It should be noted that all of these processes are suitable for the fabrication of porous matrices for the spectral filters.

Figure 11A:
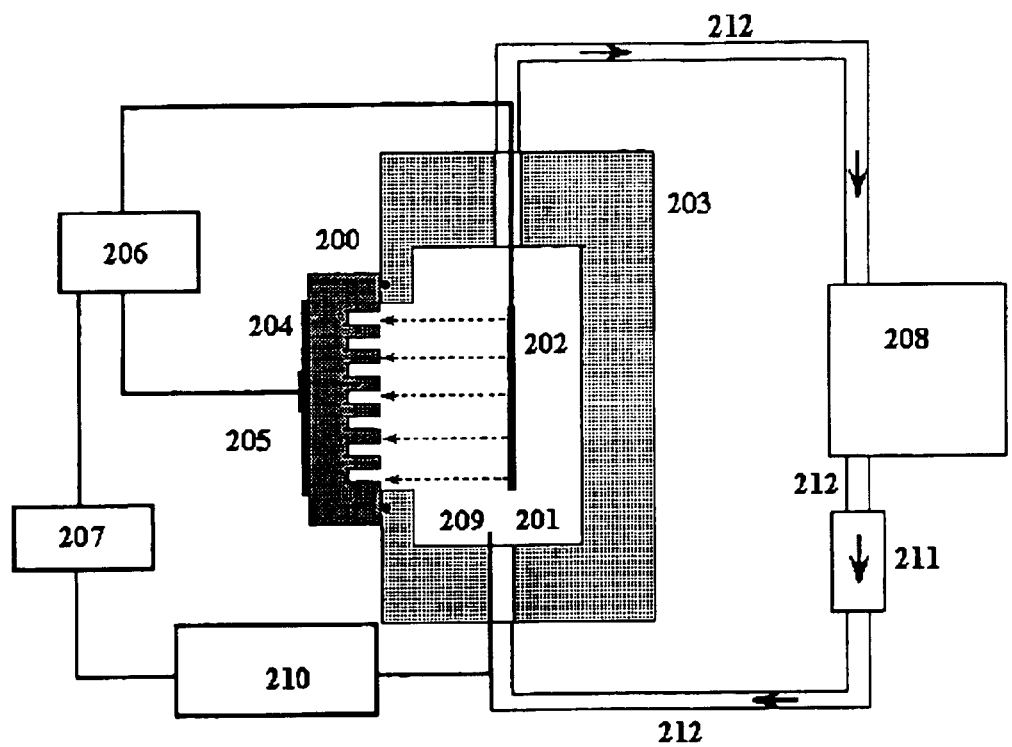
FIG. 11a is an illustrative, exemplary nonlimiting schematic view of an electrochemical etching apparatus for the etching of one wafer at a time in the absence of back-side illumination.

One illustrative, non-limiting method for the fabrication of the spectral filters will be disclosed using exemplary anodic etching of silicon. Electrochemical etching of silicon and other semiconductor materials, as well as aluminum, takes place in an electrochemical etching cell that can have several modifications according to the type of the electrochemical process used. FIG. 11a shows an exemplary illustrative schematic drawing of the etching cell that does not use any illumination (as with p-doped silicon and most of the III-V compound semiconductors) and thus yields the opportunity for etching more than one wafer at a time. Such an apparatus consists of the wafer to be etched 200 (which can be either a semiconductor or aluminum) mounted by a clamping means to the chamber 203 made of a chemically resistant material (e.g., Teflon™). Electrolyte 201 fills the chamber so all the wafer opening 200 is covered by it. The counter electrode 202, made of chemically inert material (e.g., platinum) is disposed in the electrolyte. The electrical contact layer 204 (e.g., a sputtered Al layer with optional subsequent annealing) is deposited over the backside of the wafer to be etched. A current or voltage source 206 is connected to both the contact layer 203 and electrode 202. A computer or other controller 207 is used to control the electrochemical etching. Temperature control may be employed through temperature controller 210 and temperature sensor 209 disposed within the chamber 203. Flow-through of the electrolyte is usually desirable. For this purpose, an electrolyte reservoir 208 is used with a peristaltic or other positive displacement pump 211 and chemically resistant tubing.

Figure 11B:
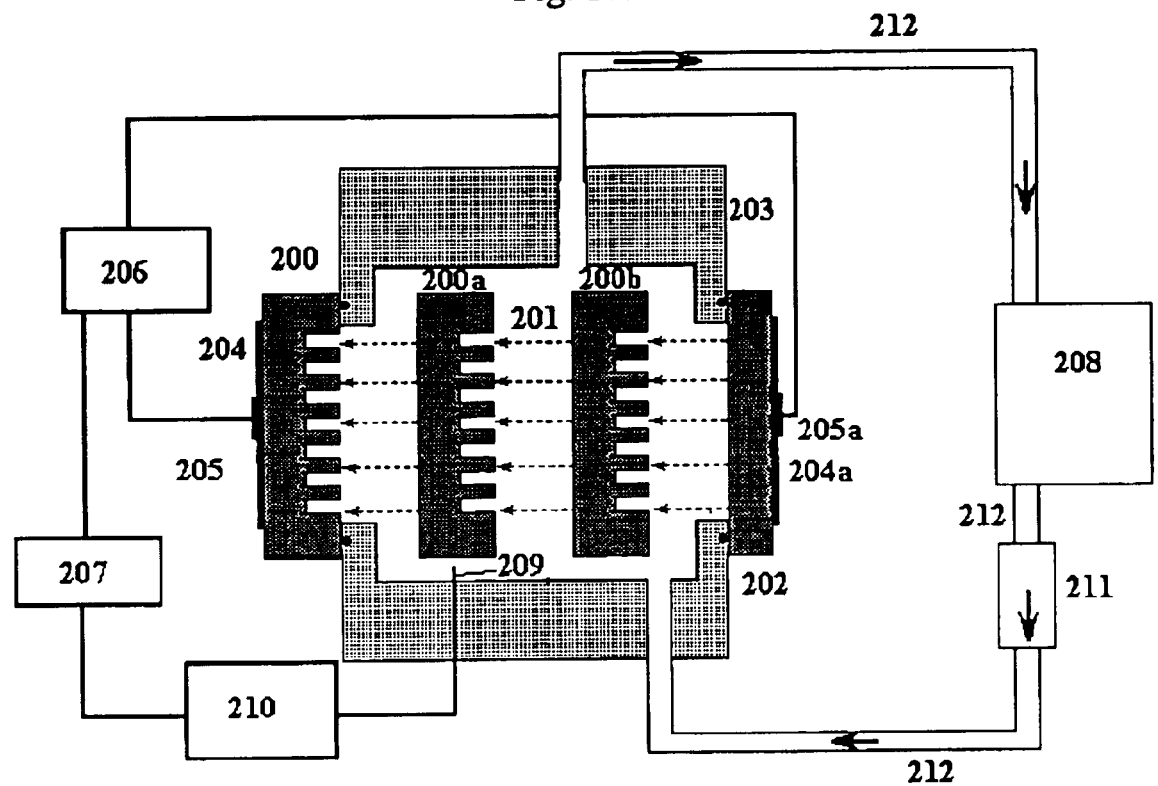
FIG. 11b is an illustrative, exemplary nonlimiting schematic view of an electrochemical etching apparatus for the etching of more than one wafer at a time in the absence of back-side illumination.

FIG. 11b shows an exemplary illustrative schematic drawing of another etching cell designed for p-type materials that does not use any illumination illustrating the ability of etching several wafers at a time. Its design is similar to that of FIG. 11a, but several wafers (e.g., 200, 200a, 200b) are placed in the path of the electric current. Such a modification of the electrochemical etching apparatus can greatly reduce the cost of spectral filter manufacturing.

Figure 11C:
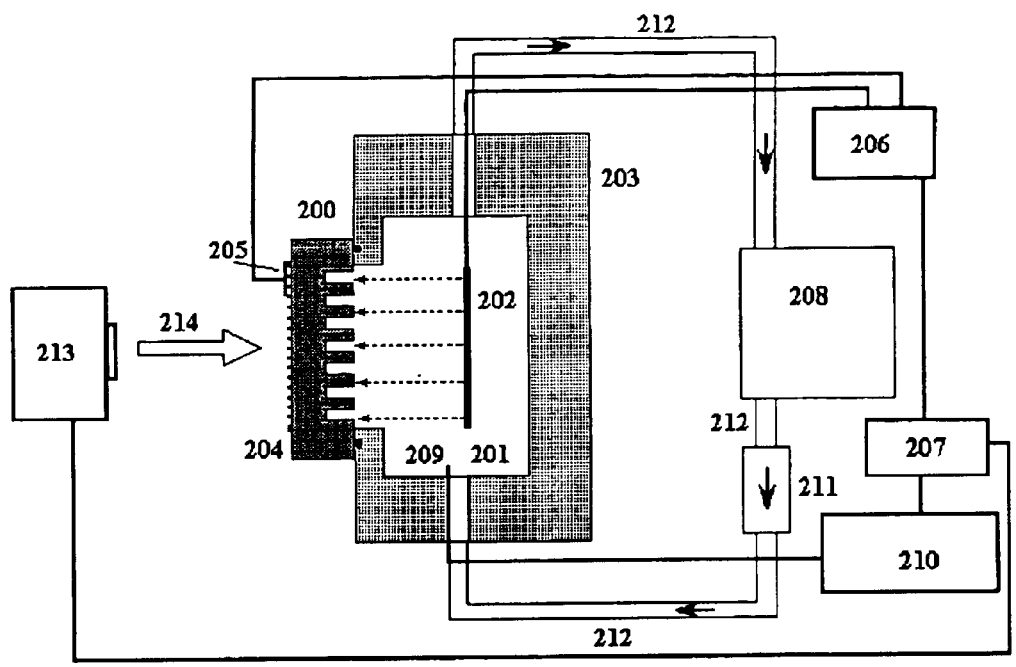
FIG. 11c is an illustrative, exemplary nonlimiting schematic view of electrochemical etching apparatus for etching one wafer at a time employing back-side illumination.

FIG. 11c shows an exemplary illustrative schematic drawing of still another etching cell that provides back-side illumination (e.g., for anodization of n-doped silicon) and because of the requirement for illumination, can only etch wafer at a time. Its design is similar to those of FIG. 11a, but in addition light source 213 is used, which generates fairly intense (from 1 to 100 mW/cm$^2$) light 214 with the wavelength below the band edge of semiconductor. The electrical contact layer 204 in this case should be either transparent (such as Indium Tin Oxide) or should be perforated so the light 214 can pass through it to illuminate the wafer to be etched 200.

One exemplary illustrative, non-limiting method of fabrication of the spectral filters will be disclosed based on the example of anodic etching of silicon. A non-limiting illustrative exemplary method of manufacturing spectral filters can be better understood from FIG. 12. FIGS. 12a–12j show exemplary intermediate steps produced by such a processes. According to one exemplary implementation, a host wafer, or substrate 11 (see FIG. 12a) of n-doped, single-crystal (100) orientation silicon having an electrical conductivity of, for example, 0.1 to 5 Ω*cm is provided. Wafer 11 has a first surface covered with the layer 12 having thickness from 5 to 500 nm, which can be, for example $SiO_2$ or $Si_3N_4$, thermally grown, sputtered, or deposited by any technique known to those skilled in the art for use as a masking material. Many masking materials and deposition methods can be used, as known to those skilled in the art.

Figure 12A:
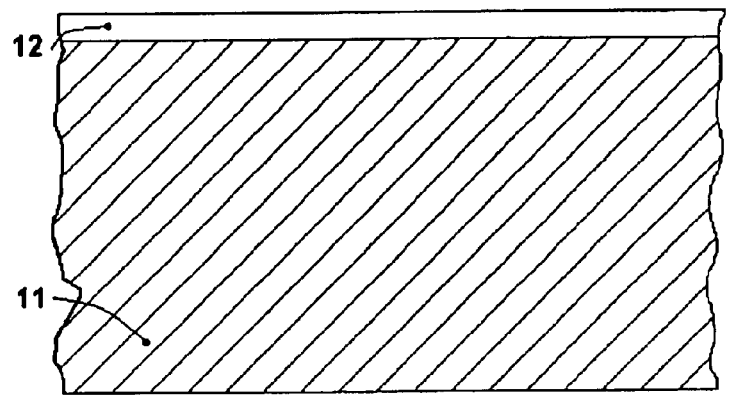
FIGS. 12a–12j are illustrative, exemplary nonlimiting schematic cross-sectional views illustrating exemplary non-limiting steps for fabricating an exemplary illustrative non-limiting implementation of a spectral filter.
Figure 12B:
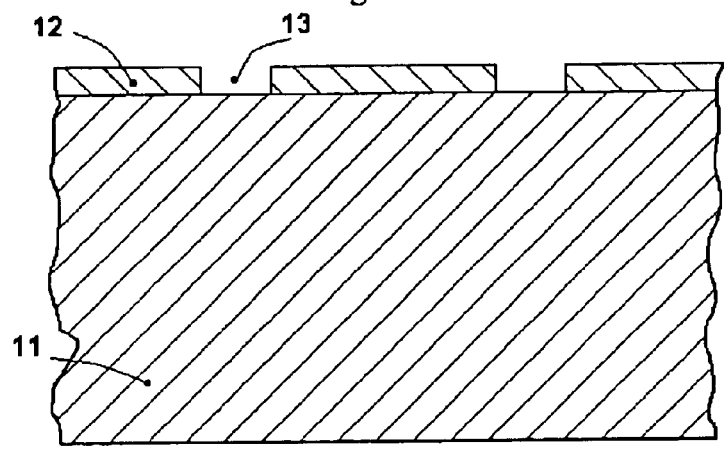

Referring now to FIG. 12b, an etching mask is produced in the layer 12 in the form of depressions 1, usually completely through the masking material, as a precursor to forming the deep pores. The remaining masking material 12 remains on the surface to protect the broad surface of the host wafer during subsequent formation of the starting etch pits. The pattern for the pores can be arranged at regular intervals, which may include orthogonal rows and columns, a hexagonal or other repeating pattern (such as an advanced hexagonal or cubic symmetry patterns in FIGS. 8 and 9). Such a pattern is termed "coherent" or "ordered". Openings 13, for example, are produced with a photoresist mask with the assistance of known photolithographic methods and subsequent etching of layer 12 through said photoresist mask. The etching technique employed can be wet chemical etching, Reactive Ion Etching, Ion Milling or any other appropriate kind of etching known to those skilled in the art. Alternatively, layer 12 with features 13 can be deposited during a photolithographic and lift-off process. By another alternative method, layer 12 can be the photoresist layer itself and the features 13 can be formed by an ordinary photolithographic process if the photoresist can withstand the etch pit formation method. Another illustrative method would comprise the application of the masking layers with features 13 by the method of micro-or nano-replication or stamping.

Figure 12C:
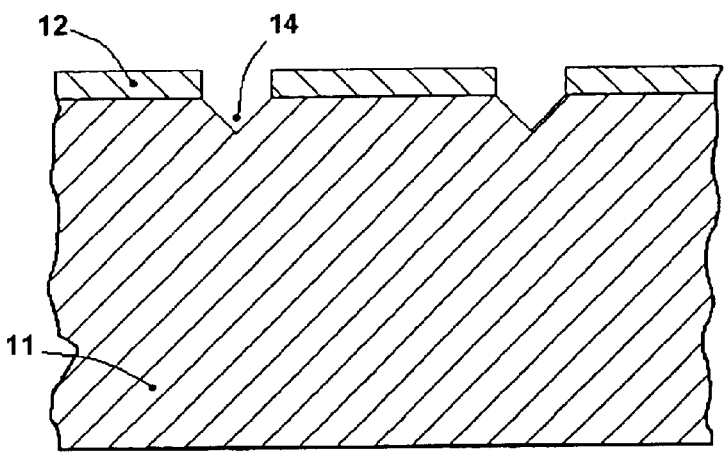

Referring now to FIG. 12c, features 13 in the layer 12 are transformed into the depressions 14 in the surface of the Si wafer 11 by etching through the mask in the form of structured in prior step layer 12. The transformation of the surface topology from layer 12 to the first surface of silicon wafer 11 can be done by alkaline etching, acidic etching, Reactive Ion Etching, Ion milling or any other etching technique known to those skilled in the art. Although in general the depressions 14 do not have to be of the inverse pyramidal shape that can be produced by anisotropic wet chemical etching of Si (by such etchants as TMAH (Tetra Methyl Ammonium Hydroxide) or KOH, the features of this shape are preferred due to the possibility of controlling the pore positions within the depressions with the spatial precision of a few nanometers. Alternatively, surface topology 14 can be formed by light-induced electrochemical etching with an electrolyte and an illumination pattern being produced on the first surface upon employment of a light source having a wavelength of less than 1100 nm. The current density in the electrolyte is set such that the anodic minority carrier current locally flows across the substrate wafer only at the illuminated locations of the illuminated pattern to create an etching erosion of the first surface at these locations to form the depressions 14. It should be noted that last method is effective only on thin (t<100 micrometers) silicon wafers if the pore-to-pore distances in the spectral filter have to be maintained below 10 micrometers. Masking layer 12 can be removed after the depressions are formed through, for example, the chamical etching.

Figure 12D:
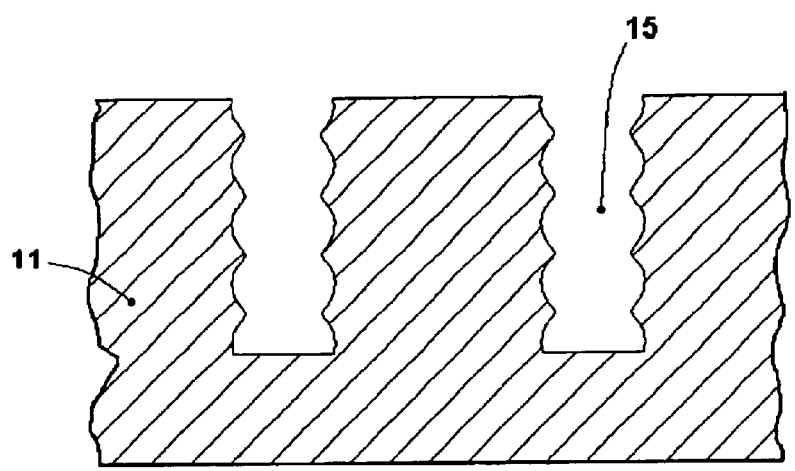

Referring now to FIG. 12d, the first surface (with depressions) of the substrate 11 is brought into contact with a fluoride-containing, acidic electrolyte. The electrolyte has a hydrofluoric acid concentration in the range of 0.5% to 50%, and preferably in the range of 2–8%. An oxidation agent, for example hydrogen peroxide, or a surfactant can be added to the electrolyte in order to suppress the development of hydrogen bubbles on the first surface of the substrate 11 during the etching process. Alternatively, the electrolyte can additionally contain a hydrogen reducing agent chosen from the group of chemicals consisting of mono-functional alkyl alcohols, or tri-functional alkyl alcohols, such as ethanol, for example. A viscosity increasing agent, for example, glycerol, can be added to the electrolyte in order to promote better quality of the macropores. The electrolyte can also additionally contain a conductivity-modifying chemical agent or wetting chemical agent.

The substrate wafer 11 is then connected as an anode. A voltage in a range of 0 volts through 100 volts (0.5 to 10 volts preferably) is applied between the substrate wafer 11 and the electrolyte. The substrate wafer 11 is illuminated with a light on from the backside of the wafer 11 so that a current density of, for example, 10 mA/cm$^2$, is set or obtained. In general, the current density is preferably set within the range of 4 mA/cm$^2$ through 20 mA/cm$^2$. Proceeding from the depressions 14 of FIG. 12c, pores 15 will be formed to extend perpendicularly to the first surface of the host wafer 11. The holes 15, also known as macropores, are produced by the electrochemical etching. A macroporous layer is thus formed in the host wafer 11 starting from the first surface. In order to obtain coherently modulated macropores in at least some part of the porous layer formed through the electrochemical process, at least one of the electrochemical process parameters (applied voltage, or, preferably, illumination intensity) will be time-modulated during some time span during the silicon anodization. In one exemplary implementation, said time-modulated parameter is the applied voltage and the modulation is periodical or near periodical with the period in the range of 5 s to 1000 s and the amplitude being in the range of 10% to 70% of the maximum value of the applied voltage. The illumination in such an implementation is kept constant. According to another illustrative implementation, the applied voltage is kept constant in a range of 0 volts through 100 volts (0.5 to 10 volts preferably), while the illumination intensity is time-modulated, said modulation being periodical or near-periodical with the period in the range of 5 and 1000 s and the amplitude in the range of 10% to 70% of the maximum value of the light intensity. According to yet another illustrative implementation, one of the parameters (e.g., illumination intensity) is time modulated, said modulation being periodical or near-periodical, while at least one other parameter (such as a temperature of the electrolyte) is changed in a slow, predetermined fashion. Alternatively, one of the parameters may be time-modulated with slowly changing modulation parameters (such as amplitude, period, etc.).

Alternatively, substrate wafer 11 can be of p-doped, single-crystal (100)-oriented silicon having an electrical conductivity of, for example, 1 to 200 Ω*cm. The steps of producing the depressions 14 on the first surface of wafer 11 are the same as for the n-type Si wafer case discussed above. The difference will be an electrolyte composition that should necessarily contain organic additives to promote macropore formation during the electrochemical etching process. For the case of electrical conductivity of the p-doped Si wafer 11 in the range of 1 to 10 Ω*cm, the electrolyte should contain a hydrofluoric acid concentration in the range of 0.5% to 50% HF by volume, and preferably in the range of 2–8%, and dimethylformamide (DMF) with a concentration in the range of 10 to 97%, and preferably in the range of 40 to 97% by volume. For the case of electrical conductivity of the p-doped Si wafer 11 being in the range of 10 to 100 Ω*cm, the electrolyte should contain a hydrofluoric acid concentration in the range of 0.5% to 50%, and preferably in the range of 2–8%. It should also contain acetonitrile (MeCN), diemethyl sulfoxide (DMSO) or DMF with a concentration in the range of 10 to 97%, and preferably in the range of 40 to 97%. Other organic additives, which serve as macropore promoters, known to those skilled in the art, can be used instead of DMF, DMSO or MeCN. In addition to said macropore-promoting organic additives, the electrolyte can contain oxidation, hydrogen-removing, wetting, viscosity- and conductivity-modifying agents, similar in function to ones disclosed above for the n-type Si case.

In both implementations disclosed above, the electrochemical etching is performed during the time required to form a macroporous layer with a thickness predetermined by the spectral filter design considerations. This time can be found before the filter process begins by means of calibration runs.

According to another implementation, the electrochemical etching process parameters (such as, for example, current density or backside illumination intensity) can be changed during an etching run such that tapered pore ends are formed on both the first surface of the Si wafer 11 and near the deep ends of the pores. This can be accomplished, for example, by setting an initial current density of 3 mA/cm$^2$ (directly for p-doped Si and by means of the illumination intensity for n-doped Si), linearly changing it to 8 mA/cm² during first 20 minutes of the etching process, setting the process parameters to obtain pores with the needed depth and profile, and then linearly changing the current density down to 3 mA/cm² during the last 20 minutes. The examples given herein do not preclude other changes of electrochemical parameters that can be done. After the electrochemical etching process is complete, the Si wafer having macropores 15 is removed from the electrochemical etching apparatus. The wafer should be carefully cleaned to insure the electrolyte is removed from the deep macropores. According to the one of the implementations of the spectral filter design, the functional spectral filter for usable in the far field is fabricated.

Figure 12E:
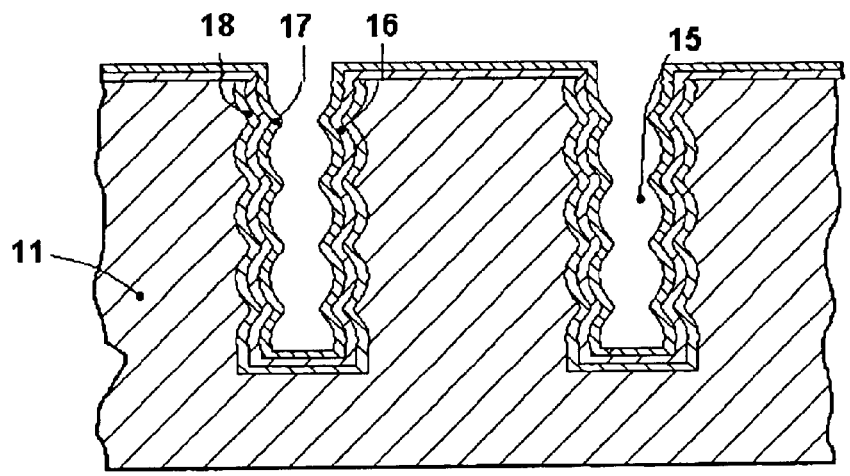

Referring now to FIG. 12e, the first surface of the silicon wafer 11, together with the pore walls, is covered uniformly by the at least one layer of dielectric material having refractive index lower than that of silicon. Layer 18 can be, for example, silicon dioxide grown by the thermal oxidation of said silicon wafer 11 in an oxygen atmosphere at temperatures of 950–1300° C. The thickness of such a thermal oxide layer is well-controlled by the temperature and time of oxidation, according to well known semiconductor processes. In order to reduce oxidation-caused stress in such an MPSi film, the wafer may be annealed for 1 hour in a nitrogen atmosphere at temperatures of 400–800° C. Alternatively, layer 18 can be $SiO_2$ deposited, for example, by Chemical Vapor Deposition (CVD), Low Pressure Chemical Vapor Deposition (LPCVD), or atomic layer chemical vapor deposition (ALCVD). Although thermal oxidation is the least expensive technique, the CVD and especially LPCVD or ALCVD will produce lower stress layers. All other layers (16, 17 on the exemplary illustrative implementation of FIG. 12e) of said at least one transparent layer can be deposited by, for example, CVD, LPCVD, ALCVD or MOCVD (Metalo-Organic Chemical Vapor Deposition) techniques. Said layers can be of $SiO_2$, $Si_3N_4$ or any other transparent dielectric material known to those skilled in the art. Alternatively, said layers (16, 17, 18 on the exemplary illustrative implementation of FIG. 12e) can be sputtered or grown by any suitable technique known by those skilled in the art. Various other modifications of multilayer deposition processes may be suggested by those skilled in the art. According to another exemplary illustrative non-limiting spectral filter design arrangement, the functional spectral filter usable in the far field is fabricated.

Figure 12F:
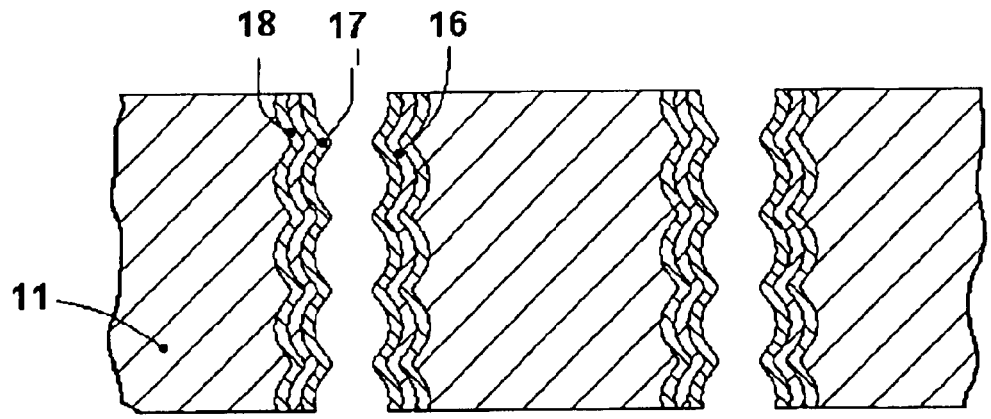

Referring now to FIG. 12f, the portion of the silicon wafer 11 not having the MPSi layer, but within the overall pattern boundaries, is removed. Removal of the said portion of wafer 11 can be done by, for example, alkaline etching of the bulk silicon from the second surface of silicon wafer 11 until the MPSi layer is reached. The etching can be done in, for example, a 40% by weight KOH water solution at a temperature of in the range of 70 to 90° C., but preferably 75° to 80° C. Alternatively, removal of said non-porous portion of wafer 11 can be accomplished by, for example, the acidic etching of the second surface of silicon wafer 11 until the MPSi layer is reached. According to a further implementation, removal of said portion of wafer 11 can be done by, for example, the mechanical grinding and polishing of the second surface of silicon wafer 11 until the MPSi layer is reached. According to a still further exemplary implementation, removing of said portion of wafer 11 can be done by, for example, the chemical-mechanical polishing of the second surface of silicon wafer 11 until the MPSi layer is reached. In accordance to still another implementation, the removal of said portion of wafer 11 can be done by, for example, reactive ion etching. It should be noted that mechanical or chemical-mechanical polishing of the second surface of said wafer can be required even after most of said portion of wafer 11 is removed by any of the aforementioned means in order to achieve the necessary optical flatness of the second surface of the final spectral filter. It should also be noted that polishing of the first surface of said wafer 11 can also be required at times in order to achieve the necessary flatness of the first surface of the final spectral filter. According to a further implementation, the removal of said portion of wafer 11 can be done particularly by Reactive Ion Etching or Deep Reactive Ion Etching.

In accordance with another exemplary implementation, the removal of the portion of the silicon wafer 11 that does not have the MPSi layer is carried out before the deposition of at least one layer of a transparent low refractive index material on the pore walls. This method can be advantageous for CVD, LPCVD, MOCVD or ALCVD methods of deposition, since the flow of gas can be directed through the pores, insuring uniform coverage of pore walls through the whole depth of said pores.

If, for a particular spectral filter design, neither pore filling by absorptive or reflective material nor coverage of either first, second or both filter surfaces by an antireflective structure is required, the spectral filter fabrication will completed at this stage. In the case that no pore filling by absorptive or reflective material is required by a particular spectral filter design, but encapsulation of the porous layer is desired, then the spectral filter should be processed further with the manufacturing step shown in FIG. 12j and taught in more detail later in the text. In the case that no pore filling by absorptive or reflective material is required by a particular spectral filter design, but the coating of either the first, second or both surfaces of the MPSi layer is needed, then the spectral filter should be processed further starting at manufacturing step shown in FIG. 12i and taught in more detail later in the text.

Figure 12G:
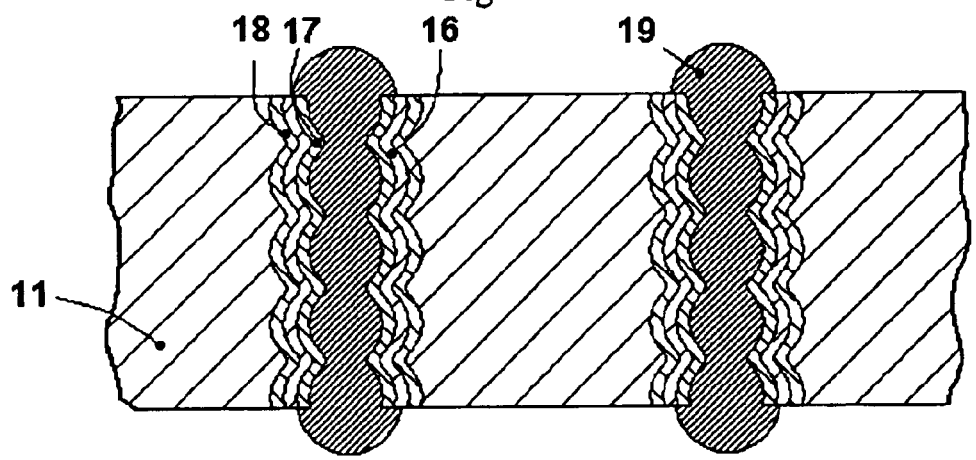

If pore filling by an absorptive or reflective material is required by a particular spectral filter design in order to suppress the cross-coupling, additional fabrication steps are needed. Referring now to FIG. 12g, the pores of the free-standing MPSi layer are filled with absorptive or reflective material 19, for example, metal or any other absorptive or reflective material known to those skilled in the art. According to one illustrative implementation, said pore filling can be accomplished by an electroplating or electroless plating process, known to those skilled in the art.

Alternatively, filling the pores with said reflective material can be accomplished by dipping the filter wafer into a melt of said reflective material. This is possible only for certain types of reflective materials the melting of which are below both the melting or reaction points of silicon and each of said at least one layer covering the pore walls. Other methods of pore filling (such as various modifications of the Chemical Vapor Deposition technique) may be used instead. Alternatively, said absorptive or reflective material can be applied as a coating of the pore walls rather that as a complete filler. For such an illustrative implementation, CVD-based pore filling is probably the best method of deposition of said material onto pore walls.

Figure 12H:
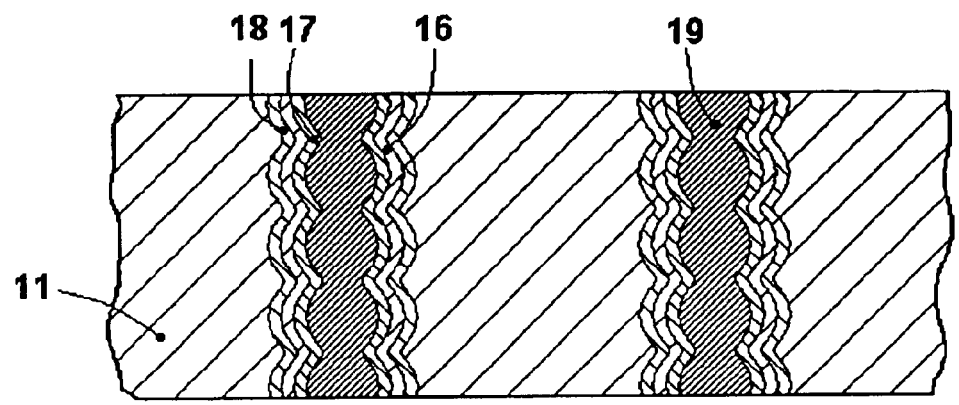

After the pore filling step is completed, said absorptive or reflective material may not only fill the pores but also may cover at least partially the areas of silicon host at both firs and second surfaces of the filter wafer. For the spectral filter to be functional, this excessive material should be removed from both said filter surfaces. Referring now to FIG. 12h, the excessive absorptive or reflective material is removed from both surfaces of spectral filter wafer by mechanical polishing of both surfaces of filter wafer until the silicon host 11 is reached. Alternatively, removal of said excessive material may be done by chemical-mechanical polishing of both surfaces of spectral filter wafer until the silicon host 11 is reached. As a further alternate method, said removal of excessive material may be done through chemical or reactive ion etching. It should be also noted that additional fine polishing of both surfaces of said may also be employed to achieve desired flatness of both surfaces of the filter wafer.

Figure 12I:
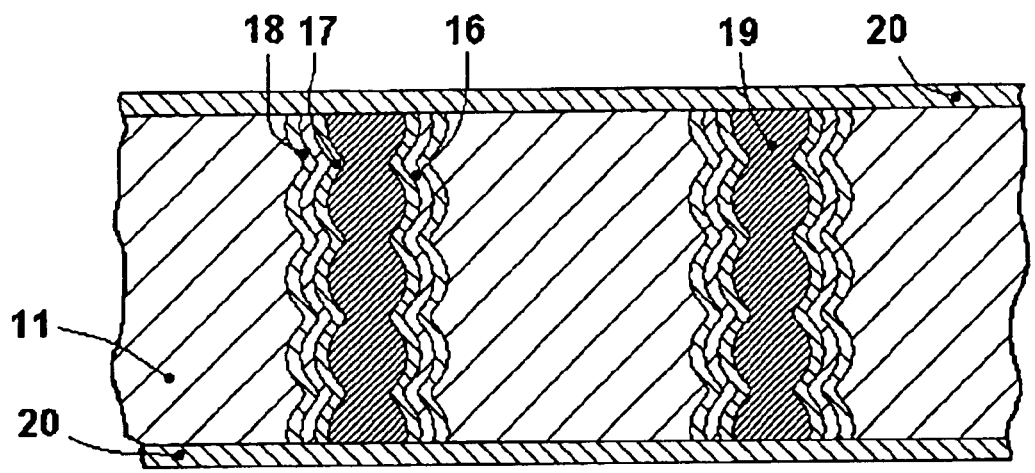

By following the process steps taught to this point, a functional spectral filter layer according to some of the implementations of spectral filter design will have been fabricated. However, to minimize coupling and outcoupling losses, an antireflection coating may be disposed on the first, second, or both surfaces of the spectral filter wafer. Referring now to FIG. 12*i*, said antireflection structure 20, which may consist of a single antireflection layer, or may be a multilayer, is deposited on either one or both surfaces of the filter wafer by a physical or chemical vapor deposition process. Alternatively, said antireflective structure 20 may be sputtered or grown by any suitable technique known by those skilled in the art.

Figure 12J:
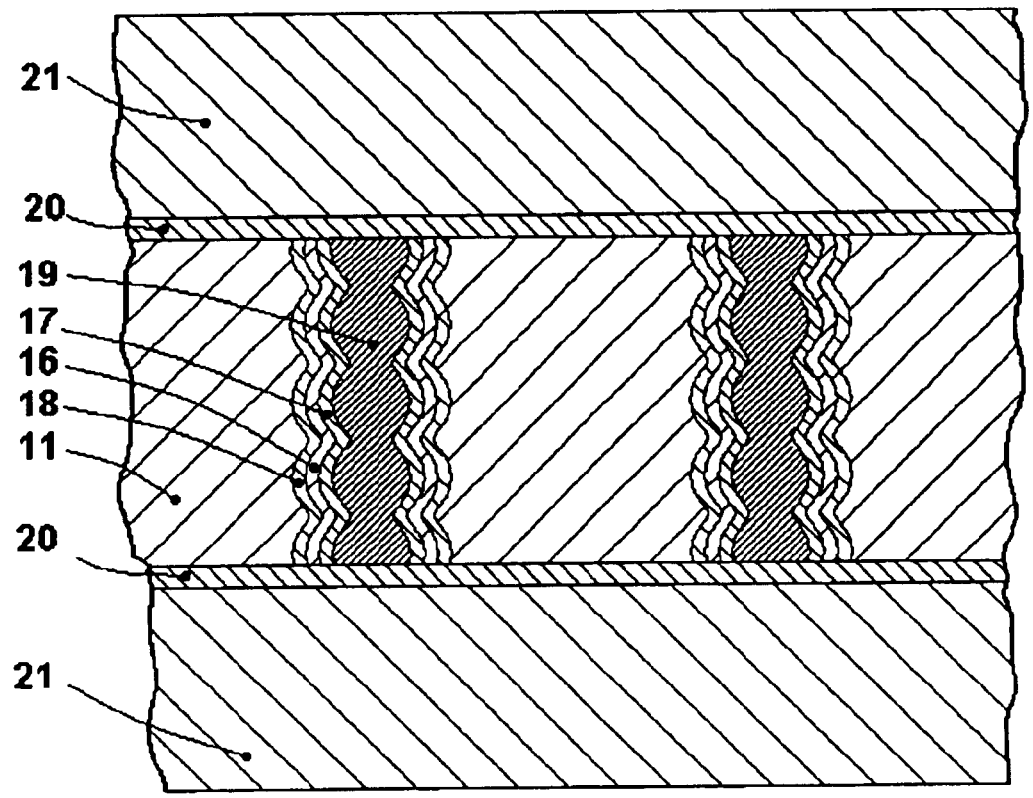

By following the spectral filter manufacturing steps disclosed herein, a functional spectral filter can be produced. However, encapsulation of the filter layer in an optically and/or chemically compatible manner that will protect it from contaminants in the atmosphere and/or mechanical damage may be required at times. Referring now to FIG. 12*j*, the first and second surfaces of the MPSi filter wafer 11 are covered by the polished wafers 21 of a material that is transparent in the pass-band of the spectral filter. According to one illustrative implementation, wafer 21 is of optical quality glass with an ionic surface treatment, and the attaching of wafer 21 to said silicon wafer is accomplished by anodic bonding or by thermal bonding. According to a still further exemplary implementation, wafer 21 is of quartz, fused silica, or any other material transparent within the pass-band of said spectral filter and the attachment of wafer 21 to said silicon wafer is accomplished through epoxy or other adhesive around the edges of said filter, to insure that the working surface area of said filter is free from epoxies. Any other method of sealing the porous structure known to those skilled in the art can be used to encapsulate the MPSi layer instead of the above example methods.

Set forth hereafter are details concerning specific experimentation examples using the methods of manufacturing taught herein. The details of these examples may be varied to an extent and are not taken as limiting. These examples have been chosen and set forth merely to illustrate and describe the concepts but are not intended to be limiting.

EXAMPLE 1

The p-doped, double-side polished (100) Si wafer used in this process was obtained from a commercial vendor to conventional semiconductor specifications, but with a 200 nm $SiO_2$ layer covering each surface. The resistivity was in the 58.9–62.8 Ohm*cm range as provided by the vendor. The wafer was then patterned on one side by a second commercial vendor to create holes through the $SiO_2$ at predetermined locations. The pattern was of round holes spaced 2.5 μm apart and having diameters of 1.25 μm in a pattern of cubic symmetry. The axes of the pattern were oriented at 45° with respect to (010) and (001) crystallographic axes of the silicon wafer. In order to start the pores in the locations of the photolithographically patterned holes in the oxide, the wafer was placed into a hot aqueous solution of KOH (40 weight percent at 80° C.) for 2 minutes so etch pits were formed inside the openings in the $SiO_2$. Next, the wafer was placed into a 48% HF aqueous solution for 2 minutes to remove the $SiO_2$ layer and was then rinsed in flowing deionized water for 2 minutes. Next, 50 nm of gold was magnetron sputtered onto the backside of the wafer. The wafer was then mounted into an anodization chamber filled with electrolyte having composition 30[48% HF]+70 [Ethanol]+160 [DMSO] by volume. The opening of the chamber was about 1.5 inches in diameter while the wafer was 2×2 inches on a side, so not all the wafer was exposed to electrolyte. The counter electrode of Pt-coated Nb mesh was placed parallel to the wafer at a distance of 3 inches. Both wafer and electrode were connected to a current source operated in the constant current mode. Twenty periods of a current waveform (40 mA for 3 minutes, linear increase to 80 mA for 1 minute, 80 mA for a minute and gradual decrease to 40 mA for 1 minute) were applied in order to modulate the pore diameters. The etching was performed at room temperature. After this time, the current was shut-off, the wafer was removed from the electrolyte and cleaned in water for 2 minutes and isopropanol for 1 minute. The wafer then was placed into Aqua Regia acid for two minutes to remove the gold layer from the backside and was carefully cleaned in water and isopropanol again. A functional far IR band-blocking filter was thus formed.

EXAMPLE 2

The method in Example 1 was repeated but improved by increasing the smoothness of the pore walls (reducing the optical scattering). To suppress the roughness, an SiO2 layer was grown on all surfaces of the wafer by means of thermal oxidation at 1050° C. in a hot furnace in air for 2 hours. The $SiO_2$ layer was then etched off the pore walls in HF (5 minutes in 48% aqueous solution under manual agitation). The wafer was then cleaned in deionized water for 5 minutes. A functional far IR band-blocking filter consisting of an attached MPSi layer having smoothed pore walls and thus less optical scattering was thus formed.

EXAMPLE 3

The method in Example 1 was repeated but modified by removing the backside of the wafer. The anodically etched wafer with closed pores was slowly inserted into a hot (1000° C.) oxidation furnace tube for 4 hours to form an oxide layer on all surfaces. Then the wafer was placed into a Reactive Ion Etching machine and an opening in the oxide layer from the back side (circular, 1 inch in diameter) was formed by etching through a photoresist mask. The wafer then was waxed by its first surface to a glass 2×2 inch wafer and placed into a hot KOH solution (the same as during etch pit process) for 12 hours. By this means, the non-porous part of the silicon wafer was removed. The wafer was then placed into an acetone bath for 6 hours to strip it from the glass plate and to remove the wax. A functional far IR band-blocking filter consisting of a free-standing MPSi layer was thus formed.

EXAMPLE 4

In a fourth example, a p-doped, double-side polished (100) higher-resistivity Si wafer and a different electrolyte were used. The resistivity was in the 67.9–73 Ohm*cm range as measured by the vendor. The wafer was oxidized in a hot tube furnace in air (1000° C.) for 4 hours, producing 200 nm of oxide on all surfaces of the silicon. The wafer was photolithographically patterned from the first side of the wafer (i.e. holes in a photoresist layer were formed at the predetermined locations). The pattern was of cubic symmetry with round holes spaced 5 µm apart and having diameters of 2.5 µm. The photoresist pattern was transferred into the SiO$_2$ layer through a reactive ion etching process. The subsequent etch pit formation and anodization steps were the same as in Example 1, except that the electrolyte was chosen to have the composition 25[HF]+70 [Ethanol]+160 [MeCN] by volume. A functional far IR band-blocking filter was thus formed.

EXAMPLE 5

In this example, the steps of Example 1 were followed except a lower resistivity wafer, a different electrolyte composition and a shorter pore cross-section modulation period were used, followed by mechanical removal of the unwanted silicon in the pore array area. The resistivity was in the 20–40 Ohm*cm range as measured by the vendor. The electrolyte had the composition 1 [48% HF]+2 [Ethanol]+12 [DMF] by volume. Thirty periods of the current waveform (35 mA for 2 minutes, gradual increase to 60 mA for 20 seconds, 60 mA for 20 seconds and gradual decrease to 35 mA for 20 seconds) were applied. After the pores were etched and the gold removed, the wafer was mechanically polished from the backside until the porous layer was reached. During this process, the wafer was waxed by its first surface to a glass 2×2 inch wafer to provide mechanical support for the MPSi layer during the polishing step. After the unwanted silicon was removed, the wafer was then placed into acetone for 6 hours to strip it from the glass plate. The wafer was cleaned in multiple fresh rinses of acetone to completely remove the remaining wax. A functional mid IR filter consisting was formed.

EXAMPLE 6

In this example, the steps of Example 1 were followed by the electroplating of copper into the pores. An electroplating cell similar to one in FIG. 11a was employed. The copper electroplating solution was obtained from a commercial vendor. A 50 nm gold layer was magnetron sputtered onto the back side of the sample. The sample was then mounted into the electroplating cell such that the porous layer was placed into the cell opening (size and shape of which were made to match the area of the MPSi layer). The electrolyte was then placed into the cell and the counter electrode was placed at some distance from the sample. Strong agitation was employed to ensure the uniformity of the electrolyte composition across the wafer opening. A constant current of 0.1 A was than applied for 1 hour. The wafer was then rinsed in DI water. A metal-filled MPSi far IR band-blocking filter was formed.

Figure 13A:
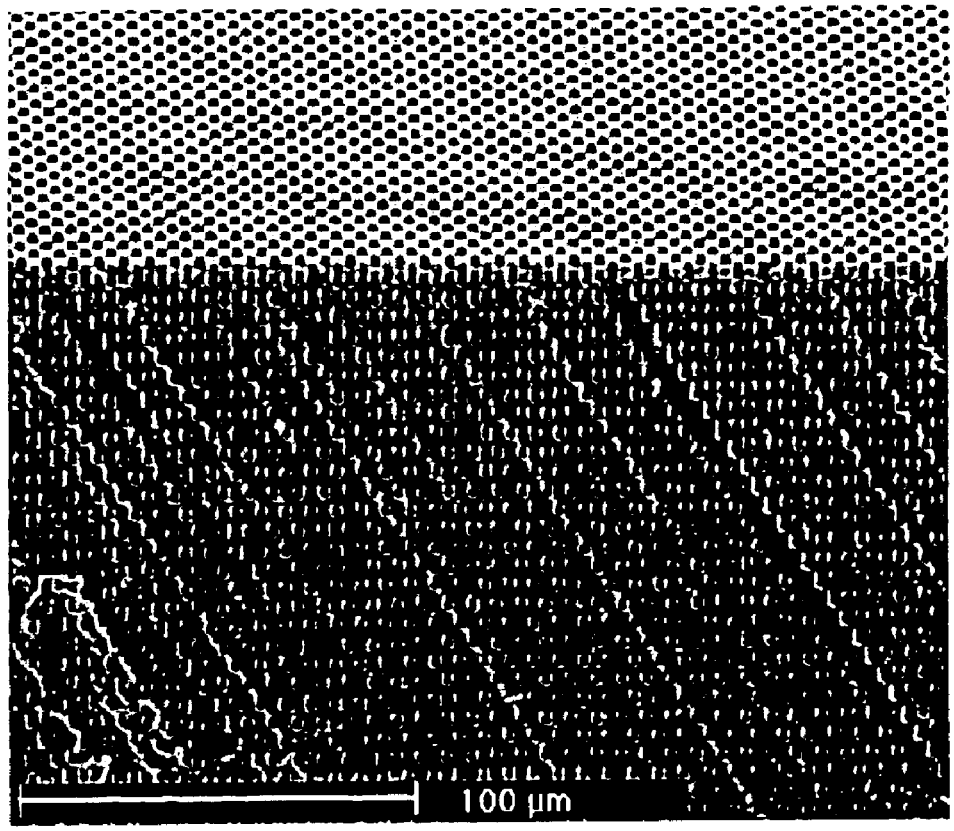
FIGS. 13a–13c are illustrative exemplary non-limiting SEM images of the different cross-sections of an MPSi filter wafer having a cubic symmetry pore array, near-square pores and pore cross sections periodically modulated along their depths.
Figure 13B:
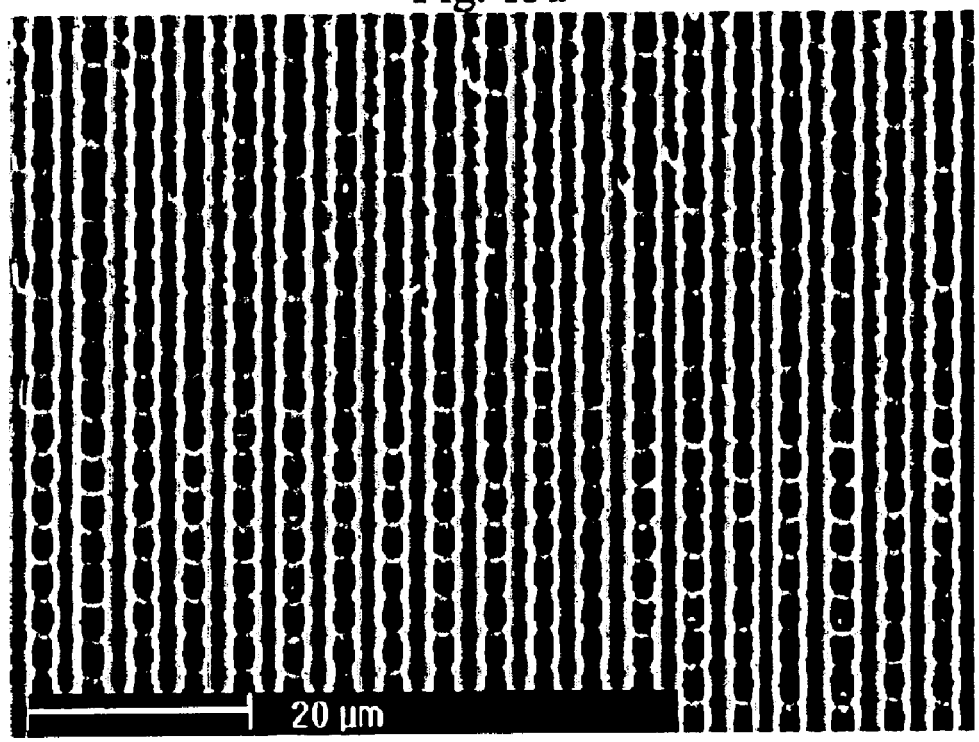
Figure 13C:
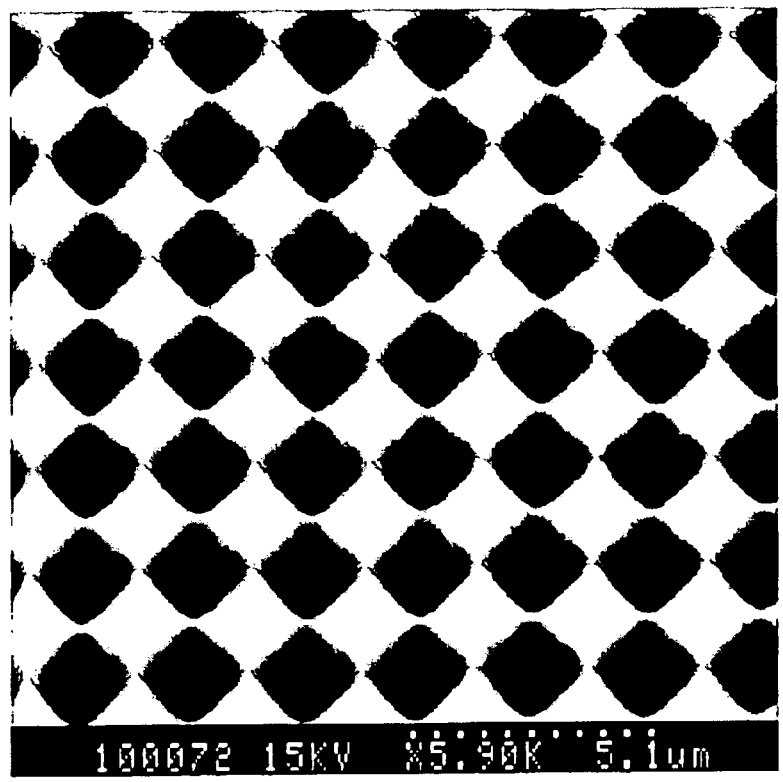
Figure 14A:
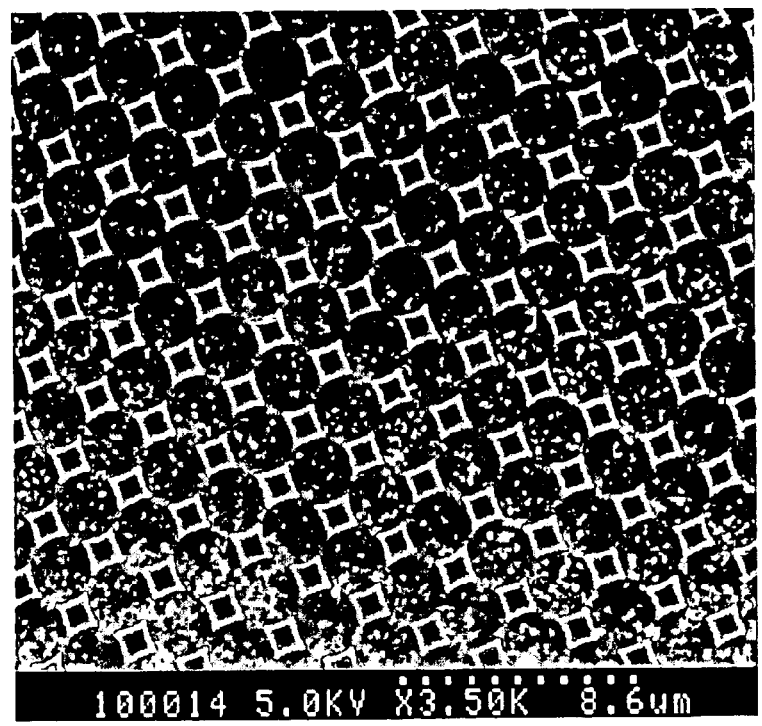
FIGS. 14a–14b are illustrative exemplary non-limiting SEM images of a cross-section perpendicular to the pore axes and parallel to them, respectively, of an MPSi filter wafer having a pore array of cubic symmetry, near-square pores and a pore filling of electroplated copper.
Figure 14B:
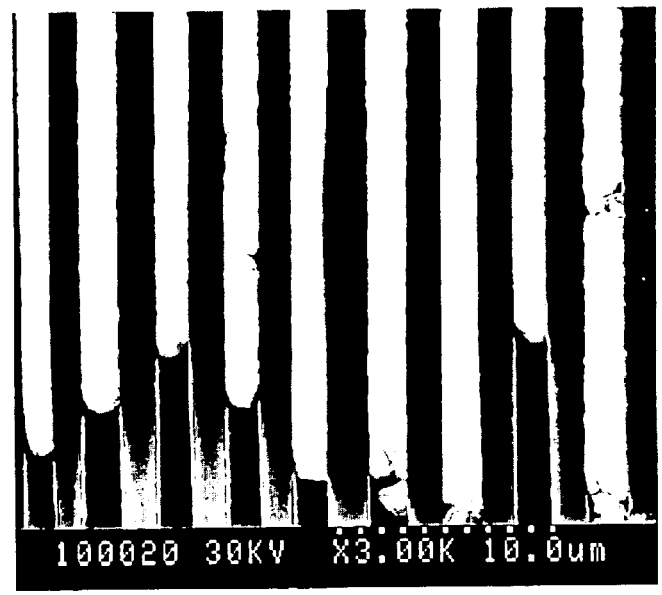

In support of the cited examples, FIGS. 13a–13c show different views of spectral filter structure comprising an MPSi array with near-square pores arranged into a cubic symmetry pattern with pore cross-sections periodically modulated along their depths and fabricated according to one of the manufacturing methods previously taught in this disclosure. FIG. 13a shows an SEM image of an MPSi layer cleaved on one plane in addition to the first surface, FIG. 13b gives an SEM image of MPSi array cleaved normal to the first surface, while FIG. 13c shows an SEM image of the first surface of the MPSi array. FIGS. 14a–14b give different views of a spectral filter structure comprising an MPSi array with near-square pores arranged into a cubic symmetry pattern with the pores filled completely with copper and fabricated according to another manufacturing method taught previously in this disclosure. FIG. 14a shows an SEM image of the first surface of the copper-filled filter wafer, while FIG. 14b gives an SEM image of a metal-filled MPSi layer cleaved normal to the first surface.

Figure 15:
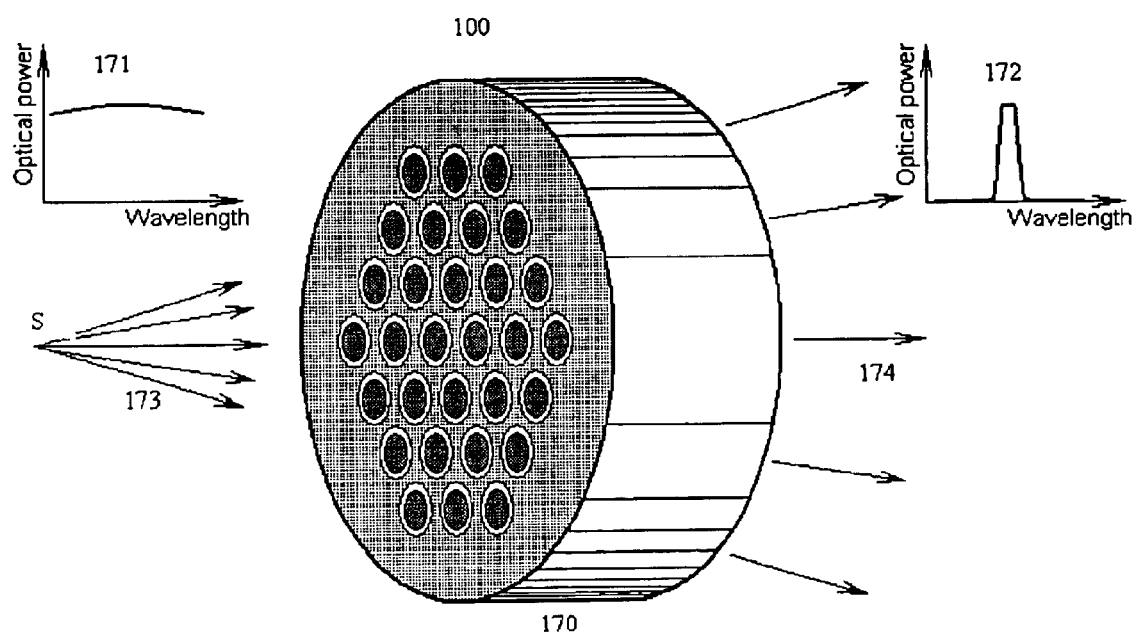
FIG. 15 is a perspective and schematic view of an exemplary illustrative non-limiting optical system employing a filter.

FIG. 15 shows an exemplary illustrative optical system 170 employing a spectral filter 100 of any of the implementations shown in FIGS. 3, 6–9 described above. In this example, a source of illumination S directs visible, near IR, mid IR or far IR wavelength radiation 173 toward the spectral filter 100. The source S in the example shown is relatively broadband in that it produces a wide range of radiation wavelengths at approximately uniform power output 171. The spectral filter 100 shown in this example implementation applies an optical filter transfer function to the incident radiation 173 (see transfer function graph shown in the upper right-hand corner of the figure 172). The radiation 174 that passes through the filter 100 is thus band-limited. This radiation may be directed toward an object to be illuminated, a process requiring particular wavelengths of visible or IR radiation, or any other desired application.

As discussed above, the preferred filters are environmentally stable, do not exhibit material delamination problems and offer superior optical performance under tilted, convergent or divergent illumination. Such filters are useful for a wide variety of applications, including applications where current filter systems cannot provide acceptable performance. For instance, optical filters will be especially useful for optical communications. In particular, Wavelength Division Multiplexing (WDM) employs narrow bandpass filters to divide and combine signals coming off or into an optical fiber. Dense channel spacing requires tight tolerances on the position, shape and width of the pass band of the filters. In contrast, prior art filters may exhibit significant dependence of the mentioned parameters on the divergence and tilting of light coming from the fiber or waveguide, thus requiring complicated aligning and collimation optics. Spectral filters would not exhibit such problems, thus will yield the opportunity to employ simpler and cheaper WDM systems. Other illustrative applications of the spectral filters include but are not limited to spectroscopy, astronomy, staring arrays, and temperature sensing.

The invention is not to be limited to the disclosed implementations, but on the contrary, is intended to cover various modifications and equivalent arrangements included within the scope of the claims.

What is claimed is:

1. A method of making a spectral filter comprising:
   providing a substrate wafer of single-crystal (100)-oriented p-doped silicon having a first surface and a second surface,
   providing etching starting points at a first surface of said semiconductor wafer, and
   electrochemically etching the substrate wafer beginning at said start points to produce a structured layer having pores with controlled depths defined at least partially therethrough, said pores having coherently modulated cross-sections at least over the part of said depth.

2. The method of claim 1, wherein said etching start points compose a regularly-arranged array of depressions on the first surface of substrate wafer.

3. The method of claim 1, wherein said etching start points are located by producing a photoresist mask on the first surface of the substrate wafer and by a subsequent etching of the first surface through said photoresist mask.

4. The method of claim 1, wherein said etching starting points are produced by disposing a layer of material with different chemical properties than those of wafer material on the first surface of substrate wafer, by producing a photoresist mask on the surface of said layer, by etching away the said chemically different material inside the photoresist mask openings and by etching the wafer surface through the thus-formed openings in said disposed chemically different material.

5. The method of claim 4, wherein said chemically different layer is silicon dioxide and is disposed by a step chosen from the group consisting of: thermal oxidation of the surface of wafer, chemical vapor deposition, wet chemical oxidation and physical vapor deposition.

6. The method of claim 4, wherein the said layer is a silicon nitride layer disposed by a step chosen from the group consisting of chemical vapor deposition and physical vapor deposition.

7. The method of claim 1, wherein said electrochemical etching includes connecting the substrate as an electrode, contacting the first surface of the substrate with an electrolyte, setting a current between said electrodes, and continuing etching to form said pores extending to a desired depth substantially perpendicular to said first surface.

8. The method of claim 1, wherein said electrolyte a fluoride-containing, acidic electrolyte.

9. The method of claim 8, wherein said electrolyte contains hydrofluoric acid in a range of 1% to 50% by volume.

10. The method of claim 8, wherein said electrolyte additionally contains an oxidizing agent.

11. The method of claim 8, wherein at least one electrochemical etching parameter selected from the group consisting of electrical current density, electrolyte temperature and/or applied voltage is changing in a predetermined fashion with time during the electrochemical etching process.

12. A method of making a spectral filter comprising:
providing a substrate wafer of single-crystal semiconductor having a first surface and a and a second surface,
providing etching start points at a first surface of said semiconductor wafer, and
etching the substrate wafer beginning at said start points to produce a structured layer having pores with controlled depths defined at least partially therethrough, said pores having coherently modulated cross-sections at least over the part of said depth,
wherein said etching start points are located by producing a photoresist mask on the first surface of the substrate wafer and by a subsequent etching of the first surface through said photoresist mask, and
wherein said etching is chosen from the group consisting of chemical etching, reactive ion etching, and ion milling.

13. The method of claim 12, wherein said chemical etching is chosen from the group consisting of alkaline etching and acidic etching.

14. A method of making a spectral filter comprising:
providing a substrate wafer of single-crystal semiconductor having a first surface and a and a second surface,
providing etching start points at a first surface of said semiconductor wafer, and
etching the substrate wafer beginning at said start points to produce a structured layer having pores with controlled depths defined at least partially therethrough, said pores having coherently modulated cross-sections at least over the part of said depth,
wherein said surface topology is produced by disposing a layer of material with different chemical properties than those of wafer material on the first surface of substrate wafer, by producing a photoresist mask on the surface of said layer, by etching away the said chemically different material inside the photoresist mask openings and by etching the wafer surface through the thus-formed openings in said disposed chemically different material, and
wherein said chemically different layer is removed from the first surface of the wafer after forming said surface topology in the wafer.

15. The method of making a spectral filter comprising:
providing a substrate wafer of single-crystal semiconductor having a first surface and a and a second surface,
providing etching start points at a first surface of said semiconductor wafer,
etching the substrate wafer beginning at said start points to produce a structured layer having pores with controlled depths defined at least partially therethroug, said pores having coherently modulated cross-sections at least over the part of said depth,
wherein said electrochemical etching occurs in a fluoride-containing, acidic electrolyte, and
wherein said electrolyte additionally contains a hydrogen reducing agent selected from the group of chemicals consisting of mono-functional alkyl alcohols, die-functional alkyl alcohols, and tri-functional alkyl alcohols.

16. The method of making a spectral filter comprising:
providing a substrate wafer of single-crystal semiconductor having a first surface and a and a second surface,
providing etching start points at a first surface of said semiconductor wafer,
etching the substrate wafer beginning at said start points to produce a structured layer having pores with controlled depths defined at least partially therethroug, said pores having coherently modulated cross-sections at least over the part of said depth,
wherein said electrolyte is a fluoride-containing, acidic electrolyte, and,
wherein said electrolyte additionally contains a viscosity-modifying agent.

17. The method of making a spectral filter comprising:
providing a substrate wafer of single-crystal semiconductor having a first surface and a and a second surface,
providing etching start points at a first surface of said semiconductor wafer,
etching the substrate wafer beginning at said start points to produce a structured layer having pores with controlled depths defined at least partially therethroug, said pores having coherently modulated cross-sections at least over the part of said depth,
wherein said electrolyte is a fluoride-containing, acidic electrolyte, and,
wherein said electrolyte additionally contains an electrical conductivity-modifying agent.

18. The method of making a spectral filter comprising:
providing a substrate wafer of single-crystal semiconductor having a first surface and a and a second surface,
providing etching start points at a first surface of said semiconductor wafer,
etching the substrate wafer beginning at said start points to produce a structured layer having pores with controlled depths defined at least partially therethroug, said pores having coherently modulated cross-sections at least over the part of said depth, wherein said electrolyte is a fluoride-containing, acidic electrolyte, and,
wherein said electrolyte additionally contains a wetting agent.

19. The method of making a spectral filter comprising:
providing a substrate wafer of single-crystal semiconductor having a first surface and a and a second surface,
providing etching start points at a first surface of said semiconductor wafer,
etching the substrate wafer beginning at said start points to produce a structured layer having pores with controlled depths defined at least partially therethroug, said pores having coherently modulated cross-sections at least over the part of said depth,
wherein said eching occurs in a fluoride-containing, acidic electrolyte, and,
wherein the electrolyte additionally contains at least one organic additive.

20. The method of claim 19, wherein the said at least one organic additive is selected from the group consisted of acetonitrile, dimethylformamide, dimethylsulfoxide, diethylenglycol, formamide, hexamethylphosphoric triamide, isopropanol, triethanolamine, 2-methoxyethyl ether, triethylphosphite, and triethyleneglycol dimethyl ether.

21. The method of making a spectral filter comprising:
providing a substrate wafer of single-crystal semiconductor having a first surface and a and a second surface,
providing etching start points at a first surface of said semiconductor wafer, and
etching the substrate wafer beginning at said start points to produce a structured layer having pores with controlled depths defined at least partially therethroug, said pores having coherently modulated cross-sections at least over the part of said depth,
wherein at least one layer of substantially transparent material is deposited onto the pore walls.

22. The method of claim 21, wherein each of said at least one layer of substantially transparent material is deposited by a technique selected from the group consisted of chemical vapor deposition, atomic layer deposition, photochemical decomposition and thermal oxidation.

23. The method of claim 21, including the removal of the unetched remainder of the wafer prior to said deposition of said at least one layer of substantially transparent material onto the pore walls.

24. The method of making a spectral filter comprising:
providing a substrate wafer of single-crystal semiconductor having a first surface and a and a second surface,
providing etching start points at a first surface of said semiconductor wafer, and
etching the substrate wafer beginning at said start points to produce a structured layer having pores with controlled depths defined at least partially therethroug, said pores having coherently modulated cross-sections at least over the part of said depth,
wherein at least one layer of absorptive and/or reflective material is deposited on the pore walls over at least part of the pore depth.

25. The method of claim 24, wherein each of said at least one layer of reflective and/or absorptive material is deposited by a technique selected from the group consisting of chemical vapor deposition, atomic layer deposition, photochemical decomposition, electroplating, electroless plating, die casting and molding.

26. The method of making a spectral filter comprising:
providing a substrate wafer of single-crystal semiconductor having a first surface and a and a second surface,
providing etching start points at a first surface of said semiconductor wafer, and
etching the substrate wafer beginning at said start points to produce a structured layer having pores with controlled depths defined at least partially therethroug, said pores having coherently modulated cross-sections at least over the part of said depth,
further including the removal of the unetched remainder of the wafer.

27. The method of claim 26, wherein said removal of the unwanted remainder of the wafer comprises a step selected from the group consisting of Reactive Ion Etching, chemical etching, grinding, mechanical and/or chemical-mechanical polishing.

28. The method of claim 27, wherein the chemically resistant layer is deposited on the pore walls prior to said removal of the unwanted remainder of the wafer.

29. The method of claim 28, wherein said chemically-resistant layer comprises Si3N4 or silicon dioxide having a thickness from about 5 nm to about 500 nm and is applied by one of the many variants of chemical vapor deposition or thermal oxidation.

30. The method of claim 29, further including removing the chemically resistant layer from the pore walls after the removal of the said unwanted remainder of the wafer.

31. The method of making a spectral filter comprising:
providing a substrate wafer of single-crystal semiconductor having a first surface and a and a second surface,
providing etching start points at a first surface of said semiconductor wafer, and
etching the substrate wafer beginning at said start points to produce a structured layer having pores with controlled depths defined at least partially therethroug, said pores having coherently modulated cross-sections at least over the part of said depth, and
further including coating the first, second or both surfaces of said spectral filter with at least one layer of material intended to suppress the reflection from said surfaces of said spectral filter in at least some wavelength ranges inside the transparency wavelength range of said spectral filter.

32. The method of claim 31 wherein said antireflective structure is disposed by the technique chosen from the group consisting of thermal oxidation, chemical vapor deposition, physical vapor deposition and/or thermal evaporation.

33. The method of claim 32 wherein said sealing step comprises at least one of the group consisting of anodic bonding, thermal bonding, glass frit bonding, brazing or adhesive bonding.

34. The method of making a spectral filter comprising:
providing a substrate wafer of single-crystal semiconductor having a first surface and a and a second surface,
providing etching start points at a first surface of said semiconductor wafer, and
etching the substrate wafer beginning at said start points to produce a structured layer having pores with controlled depths defined at least partially therethroug, said pores having coherently modulated cross-sections at least over the part of said depth,
further including sealing said spectral filter with two flat plates of material that is transparent within the transparency range of said spectral filter.

35. The method of making a spectral filter comprising:

providing a substrate wafer of single-crystal semiconductor having a first surface and a and a second surface, providing etching start points at a first surface of said semiconductor wafer, and etching the substrate wafer beginning at said start points to produce a structured layer having pores with controlled depths defined at least partially therethroug, said pores having coherently modulated cross-sections at least over the part of said depth, and wherein a roughness suppression procedure is performed subsequently to said etching of the substrate wafer.

36. The method of claim 35 wherein said roughness suppression procedure includes chemical etching of said pore walls.

37. The method of claim 36 wherein said chemical etching takes place in a heated alkaline solution.

* * * * *